United States Patent
Paredes Cabrera et al.

(10) Patent No.: US 10,237,850 B2
(45) Date of Patent: Mar. 19, 2019

(54) SYSTEM AND METHOD FOR MANAGEMENT OF PERIODIC RESOURCES IN A COMMUNICATION NETWORK

(71) Applicant: Telefonaktiebolaget LM Ericsson (publ), Stockholm (SE)

(72) Inventors: Ricardo Paredes Cabrera, Ottawa (CA); Daniel Gravelle, Kanata (CA); Bing Z. Hu, Kanata (CA); Alex Hubbard, Ottawa (CA); Thomas Mesfin, Kanata (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/523,902

(22) PCT Filed: Nov. 3, 2014

(86) PCT No.: PCT/IB2014/065774
§ 371 (c)(1),
(2) Date: May 2, 2017

(87) PCT Pub. No.: WO2016/071732
PCT Pub. Date: May 12, 2016

(65) Prior Publication Data
US 2017/0332350 A1 Nov. 16, 2017

(51) Int. Cl.
*H04W 72/00* (2009.01)
*H04W 72/08* (2009.01)
*H04W 72/12* (2009.01)

(52) U.S. Cl.
CPC ....... *H04W 72/005* (2013.01); *H04W 72/082* (2013.01); *H04W 72/1252* (2013.01)

(58) Field of Classification Search
CPC ... H04W 4/70; H04W 36/0033; H04W 36/08; H04W 36/38; H04W 72/005; H04W 72/082; H04W 72/1257; H04W 72/1289
See application file for complete search history.

(56) References Cited

U.S. PATENT DOCUMENTS

2014/0348050 A1* 11/2014 Kim ................ H04L 5/0082
370/312
2015/0098371 A1* 4/2015 Vajapeyam .......... H04L 1/1822
370/280

(Continued)

FOREIGN PATENT DOCUMENTS

| EP | 2 704 458 A1 | 3/2014 |
|---|---|---|
| WO | 2011019172 A1 | 2/2011 |
| WO | 2013171256 A1 | 11/2013 |

OTHER PUBLICATIONS

International Search Report and Written Opinion dated Jul. 2, 2015 for International Application Serial No. PCT/IB2014/065774, International Filing Date: Nov. 3, 2014 consisting of 10-pages.

(Continued)

*Primary Examiner* — Benjamin H Elliott, IV
(74) *Attorney, Agent, or Firm* — Christopher & Weisberg, P.A.

(57) ABSTRACT

A system and method for handling conflicts between periodic resources configured or assigned to a wireless device in a communication network including, in one embodiment, a system and method for determining whether a conflict exists between a first periodic resource occurring with a first periodicity and at least one other periodic resource occurring with a second periodicity in a search region defined based on the first periodicity and the second periodicity, and when a conflict exists, configuring the at least one other periodic resource at a conflict-free position in the search region. By defining the search region based on periodicities of conflict- (Continued)

ing resources, the present disclosure helps to reduce computations and/or processing time required for identifying and resolving conflicts.

28 Claims, 13 Drawing Sheets

(56) References Cited

U.S. PATENT DOCUMENTS

2016/0095093 A1\* 3/2016 Yi .......................... H04L 5/001
   370/280
2017/0332350 A1\* 11/2017 Paredes Cabrera ..........................
   H04W 72/082

OTHER PUBLICATIONS

3GPP TSG RAN WG2#74, R2-112810, Title: "SPS Transmission in MBSFN Subframes," Source: CATT, Agenda Item: 6.6.1, Document for Discussion and Decision, Conference Location and Date: Barcelona, Spain, May 9-13, 2011 consisting of 3-pages.
Gao JK, Zhang DM, Chen FT. Title: "Research on Uplink Semi-Persistent Scheduling in LTE System," Published in: 2013 Trans Tech Publications., Advanced Materials Research, vol. 791:1952-1956, 2013 consisting of 6-pages.

\* cited by examiner

SYSTEM AND METHOD FOR MANAGEMENT OF PERIODIC RESOURCES IN A COMMUNICATION NETWORK

CROSS-REFERENCE TO RELATED APPLICATION

This application is a Submission Under 35 U.S.C. § 371 for U.S. National Stage Patent Application of International Application Number: PCT/IB2014/065774, filed Nov. 3, 2014 entitled "SYSTEM AND METHOD FOR MANAGEMENT OF PERIODIC RESOURCES IN A COMMUNICATION NETWORK," the entirety of which is incorporated herein by reference.

TECHNICAL FIELD

The present disclosure relates to a method and system for resource management in a communication network.

BACKGROUND

In order to provide enhanced communication services, Third Generation Partnership Project (3GPP) cellular communication systems are designed to support a variety of different and enhanced services. One such enhanced service, named Multimedia Broadcast and Multicast Services (MBMS), is specified in 3GPP Technical Specification (3GPP TS) 36.331, Radio Resource Control, v. 12.3.0. Examples of MBMS services (evolved MBMS (eMBMS) services for LTE networks) and applications include multimedia broadcast, e.g. mobile television, audio, streamed video, etc. Some multimedia services require a high bandwidth due to the nature of the data content that is to be communicated, such as video streaming. Some multimedia services may only require a low bandwidth due to the nature of the data content that is to be communicated, such as news services. Typically, tens of channels carrying say, news, movies, sports, etc. may be broadcast simultaneously over an MBMS communication network.

For MBMS operation, a single radio transmission mode may be used, termed Multicast Broadcast Single Frequency Network (MBSFN). In this Point-To-Multipoint (PTM) transmission mode of operation, multiple communication cells synchronously transmit the same MBMS content in their respective service areas. The area covered by the participating communication cells of such a synchronised transmission is referred to as the 'MSFSN area'. Synchronous transmission of the same MBMS content is achieved by a central network entity, termed the Multi-cell/multicast Coordination Entity (MCE), which is configured to decide both the radio resources that are used for the MBSFN transmission as well as the details of the radio resource configuration, i.e. the layer-1/layer-2 (L1/L2) configuration parameters to be used. A communication cell may participate in MBMS transmissions corresponding to different MBSFN areas, in which case MBSFN areas overlap. The radio transmission area of MBMS user data is the same as that used for the corresponding control information, i.e. the cells that participate in the transfer of the user data also participate in the transfer of the corresponding control information.

As specified in the 3GPP TS 36.331 standard, when an MBMS service (e.g. an eMBMS service) is enabled, some of the available subframes within a finite number of consecutive radio frames (or system frames) are allocated to the MBMS service. This MBMS subframe allocation can be repeated periodically. The periodicity can be set to one, two, four, eight, sixteen or thirty-two radio frames. The standard further specifies ways to extend the periodicity to 64, 128 and 256 radio frames. These defined procedures give flexibility to the operator to adjust the bandwidth allocation for MBMS services.

Normally, before the establishment of an MBMS service, a subframe allocation for the MBMS service is semi-statically configured ie. MBMS services are scheduled in the order in which they are listed on the multicast control channel (MCCH). Once configured, the MBMS subframe pattern allocated typically does not change and is indicated in a System Information Block 2 (SIB2) broadcast message as part of the Multicast Broadcast Single-Frequency Network (MBSFN) SubframeConfiguration Information Element (IE). Depending on the needs, an MBMS service can be configured on any number and/or any combination of subframes (with certain exceptions) within a radio frame, up to a maximum percentage (typically 60%) of the available bandwidth. These MBMS subframes (or MBSFN subframes) are only available for MBMS transmissions once the radio resources are allocated for broadcast/multi-cast services, i.e., they typically can't be used for unicast traffic like for example Voice over Long Term Evolution (VoLTE) or File Transfer Protocol (FTP) services.

A drawback of multicast/broadcast communications transmissions (such as MBMS) is that once configured, the (periodic) resources allocated do not change. This may result in conflicts with other resources already configured and/or needed for other services or activities at the UE. In the context of UE mobility in LTE networks for example, the E-UTRAN is required to allocate time and/or radio resources for a UE to perform radio frequency measurements on various channels (e.g. on the frequency channel used by its serving cell, other E-UTRA frequencies and/or frequencies used by other Radio Access Technologies). Since UEs typically employ a single transceiver, it is not possible for the UE to perform these inter-frequency and inter-RAT measurements, whilst it is engaged in a (unicast or multicast) data transmission with the serving cell, as the transceiver is fully occupied in its communications on a particular frequency channel. To overcome this, the E-UTRAN in 3GPP has been designed to configure time segments in which it does not schedule any downlink data transfer or uplink grants. During these periodically appearing segments, also referred to as "measurement gaps (or "mobility gaps" in the context of handovers), the UE is able to perform the required (periodic) measurements on the serving or other frequency channels, as detailed above. Depending on the bandwidth required, when an MBMS service is initiated, the periodic subframe resource configuration allocated for the MBMS service may conflict with measurement gaps a UE needs to perform radio frequency measurements.

Another potential area of conflict is in relation to Discontinuous Reception (DRX) resources. As is well known, DRX reduces battery consumption in UE by limiting the time when Downlink (DL) receptions need to be monitored by the UE. In other words, the UE can only be scheduled when the UE monitors the PDCCH. This implies that the UE can only be scheduled resources during (periodic) segments of time when the UE is awake (also known as the "active time", "wake time" or "on duration"). In LTE networks, the DRX resource configuration is controlled by the eNB and is specific to each UE. Once a DRX resource configuration has been received from the eNB, UEs normally use a timer referred to as the "onDuration" timer to determine when to be awake. To spread the scheduling load in time, the eNB will typically configure UEs with a particular (and preferably different) DRX configuration such that UEs do not have simultaneous wake times. When an MBMS service is established, it is quite possible that the subframe resource configuration allocated for the MBMS service conflicts with the UE's DRX resource configuration.

SUMMARY

Given the above, it would be desirable to avoid such conflicts, particularly for services with pre-configured resources (e.g. MBMS) or time-sensitive services such as, for example, Voice over LTE (VoLTE) where subframes used for MBMS services during the DRX wake time may introduce additional delays in the scheduling of VoLTE packets which in turn may substantially affect the perceived speech quality. Although the voice quality can be partially recovered if DRX is disabled for the VoLTE Radio Access Bearer (RAB) resources used, the improvement would be obtained at the expense of battery drain at the UEs, which is undesirable.

To address the above-noted deficiencies, the present disclosure provides an efficient method and system for handling conflicts between resources configured or assigned to a wireless device in a communication network.

According to a broad aspect of the disclosure, there is provided a method for a node in a communication network for configuring periodic radio resources for a wireless device in the communication network. The method includes determining whether a conflict exists between a first periodic resource occurring with a first periodicity and at least one other periodic resource occurring with a second periodicity, and when a conflict exists, sending a configuration message to configure the at least one other periodic resource at a conflict-free position.

In this aspect, in some embodiments, determining whether there is a conflict includes determining whether a conflict exists in a search region defined based on the first periodicity and the second periodicity. In some other embodiments, the search region is defined based on a product of the first periodicity and the second periodicity. In some other embodiments, the first periodic resource is one of a Multimedia Broadcast Multicast Server (MBMS) resource, an Observed Time Difference of Arrival (OTDOA) resource, an Automatic Neighbor Relations (ANR) resource, and a measurement gap resource. In some other embodiments, the at least one other periodic resource is at least one of a Discontinuous Reception (DRX) resource, a Channel Quality Indicator (CQI) resource, a Scheduling Request (SR) resource and a mobility gap resource.

In yet some other embodiments, the node is a base station node and the configuration message is a reconfiguration message indicative of a reconfiguration for the at least one other resource. Alternatively, the node is a wireless device node and the configuration message is a reconfiguration indication message indicative of a suggested reconfiguration for the at least one other periodic resource.

In yet some other embodiments, the at least one other periodic resource comprises a plurality K of secondary periodic resources, each occurring with a respective one of a plurality K of periodicities and wherein the second periodicity is a periodicity of one of the plurality K of secondary resources. In yet some other embodiments, the search region is equal to the product of the first periodicity and the second periodicity divided by a greatest common denominator of the first and second periodicity.

In yet some other embodiments, the configuration message is for configuring the at least one other periodic resource at a conflict-free position in a relocation window of the search region corresponding to a period of the first periodicity. In yet some other embodiments, determining whether a conflict exists includes determining that a conflict exists when an occurrence of the first periodic resource overlaps with an occurrence of the at least one other periodic resource in the search region. In yet some other embodiments, determining whether a conflict exists includes determining that no conflict exists when each occurrence of the first periodic resource in the search region does not overlap with any occurrence of the at least one other periodic resource in the search region. In yet some other embodiments, when a conflict exits with a secondary periodic resource, the method further includes moving the secondary periodic resource to a new position in the search region and when the new position does not overlap any other secondary periodic resource, sending the configuration message to configure the secondary periodic resource to the new position as the conflict-free position in the search region. In yet some other embodiments, when the new position overlaps with another secondary periodic resource, the method further includes moving the secondary periodic resource until the secondary periodic resource does not overlap with any other secondary periodic resource.

In yet some other embodiments, each of the first and the at least one other periodic resource is associated with a respective length, offset and periodicity. In yet some other embodiments, the at least one other periodic resource is a configured periodic resource and the configuration message is to re-configure the at least one other periodic resource to the conflict-free position in the search region.

In another broad aspect of the disclosure, there is provided a node for configuring periodic radio resources for a wireless device node, where the node contain instructions which, when executed, cause the node to determine whether a conflict exists between a first periodic resource occurring with a first periodicity and at least one other periodic resource occurring with a second, and when a conflict exists, send a configuration message to configure the at least one other periodic resource at a conflict-free position.

In some embodiments, the instructions further cause the node to determine whether a conflict exists in a search region defined based on the first periodicity and the second periodicity. In some other embodiments, the search region is defined based on a product of the first periodicity and the second periodicity. In some other embodiments, the circuitry includes a memory and one or more processors. In some other embodiments, the first periodic resource is one of an MBMS resource, an OTDOA resource, an ANR resource, and a measurement gap resource. In some other embodiments, the at least one other periodic resource is one of a DRX resource, a CQI resource, an SR resource and a mobility gap resource.

In yet some other embodiments, the node is a base station node and the configuration message is a reconfiguration message for the wireless device node, indicative of a reconfiguration for the at least one other resource. In yet some other embodiments, the node is a wireless device node and the configuration message is a reconfiguration indication message for a base station node, indicative of a suggested reconfiguration for the at least one other periodic resource.

In yet some other embodiments, the at least one other periodic resource comprises a plurality K of secondary periodic resources, each occurring with a respective one of a plurality K of periodicities and wherein the second periodicity is a periodicity of one of the plurality K of secondary resources. In yet some other embodiments, the search region is equal to the product of the first periodicity and the second periodicity divided by a greatest common denominator of the first and second periodicity.

In yet some other embodiments, the configuration message is to configure the at least one other periodic resource at a conflict-free position in a relocation window of the search region corresponding to a period of the first periodicity. In yet some other embodiments, the instructions further cause the node to determine that a conflict exists when an occurrence of the first periodic resource overlaps with an occurrence of the at least one other periodic resource in the search region.

In yet some other embodiments, the instructions further cause the node to determine that no conflict exists when each occurrence of the first periodic resource in the search region does not overlap with any occurrence of the at least one other periodic resource in the search region. In yet some other embodiments, when a conflict exits with a secondary periodic resource, the instructions further cause the node to move the secondary periodic resource to a new position in the search region, and when the new position does not overlap any other secondary periodic resource, send the configuration message to configure the secondary periodic resource to the new position as the conflict-free position in the search region.

In yet some other embodiments, when the new position overlaps with another secondary periodic resource, the instructions further cause the node to move the secondary periodic resource until the secondary periodic resource does not overlap with any other secondary periodic resource. In yet some other embodiments, each of the first and the at least one other periodic resource is associated with a respective length, offset and periodicity. In yet some other embodiments, the at least one other periodic resource is a configured periodic resource and wherein the configuration message is to re-configure the at least one other periodic resource to the conflict-free position in the search region.

In yet another broad aspect of the disclosure, there is provided a node for configuring periodic radio resources for a wireless device node, where the node includes a conflict determination module for determining whether a conflict exists between a first periodic resource occurring with a first periodicity and at least one other periodic resource occurring with a second. The node also includes a configuration module for sending a configuration message to configure the at least one other periodic resource at a conflict-free position when a conflict exists.

In some embodiments, the conflict determination module is for determining whether a conflict exists in a search region defined based on the first periodicity and the second periodicity. In some other embodiments, the search region is defined based on a product of the first periodicity and the second periodicity. In some other embodiments, the first periodic resource is one of an MBMS resource, an OTDOA resource, an ANR resource, and a measurement gap resource. In some other embodiments, the at least one other periodic resource is one of a DRX resource, a CQI resource, an SR resource and a mobility gap resource.

In yet some other embodiments, the node is a base station node and the configuration message is a reconfiguration message for the wireless device node, indicative of a reconfiguration for the at least one other resource. In yet some other embodiments, the node is a wireless device node and the configuration message is a reconfiguration indication message for a base station node, indicative of a suggested reconfiguration for the at least one other periodic resource.

In yet some other embodiments, the at least one other periodic resource includes a plurality K of secondary periodic resources, each occurring with a respective one of a plurality K of periodicities and wherein the second periodicity is a periodicity of one of the plurality K of secondary resources. In yet some other embodiments, the search region is equal to the product of the first periodicity and the second periodicity divided by a greatest common denominator of the first and second periodicity.

In yet some other embodiments, the configuration message is to configure the at least one other periodic resource at a conflict-free position in a relocation window of the search region corresponding to a period of the first periodicity. In yet some other embodiments, the conflict determination module is for determining that a conflict exists when an occurrence of the first periodic resource overlaps with an occurrence of the at least one other periodic resource in the search region.

In yet some other embodiments, the conflict determination module is for determining that no conflict exists when each occurrence of the first periodic resource in the search region does not overlap with any occurrence of the at least one other periodic resource in the search region. In yet some other embodiments, when a conflict exits with a secondary periodic resource, the configuration module is for moving the secondary periodic resource to a new position in the search region, and when the new position does not overlap any other secondary periodic resource, send the configuration message to configure the secondary periodic resource to the new position as the conflict-free position in the search region.

In yet some other embodiments, when the new position overlaps with another secondary periodic resource, the configuration module is for moving the secondary periodic resource until the secondary periodic resource does not overlap with any other secondary periodic resource. In yet some other embodiments, each of the first and the at least one other periodic resource is associated with a respective length, offset and periodicity. In yet some other embodiments, the at least one other periodic resource is a configured periodic resource and wherein the configuration message is to re-configure the at least one other periodic resource to the conflict-free position in the search region.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
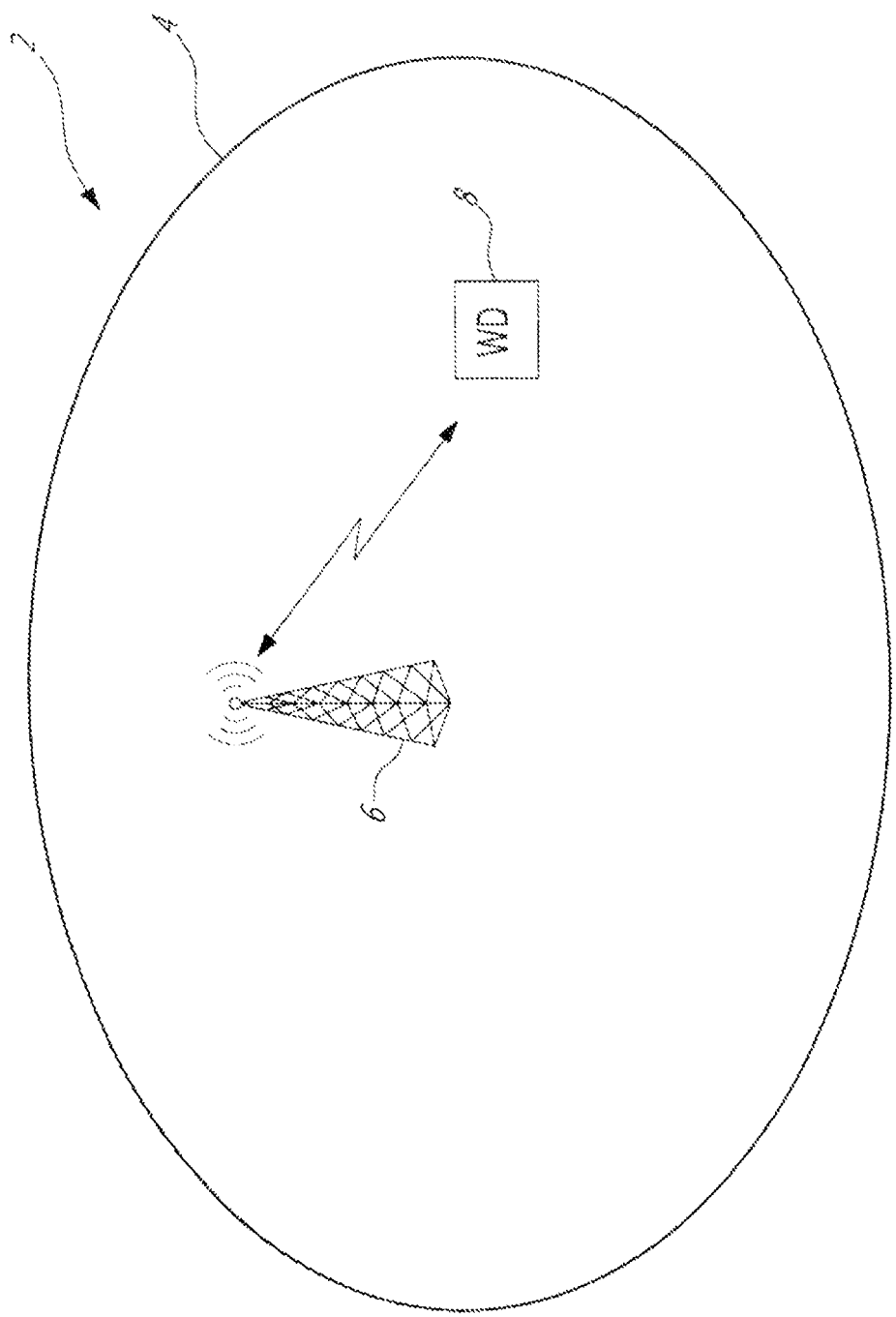
FIG. 1 illustrates a wireless communication network that uses periodic resources according to one embodiment of the present disclosure.

The embodiments described herein provide an efficient method and system for handling conflicts between resources configured or allocated a wireless device in a communication system.

Accordingly, the node, method and system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements.

The embodiments disclosed herein are directed to methods and systems for handling conflicts between periodic resources (e.g. subframes or SFs) configured for or allocated to a wireless device in a communication system. In an Long Term Evolution (LTE) network for example, the periodicity of a resource is typically expressed as a number of subframes (SFs) but can also be expressed in other ways, e.g. as a measure of time, number of frames or other unit that directly or indirectly defines the resource.

The embodiments described herein are with respect to periodic resources. A periodic resource as herein-described may be viewed as a measure of time and/or frequency resources periodically allocated in particular cells (e.g. multicast or broadcast services) or to one or more wireless devices in a cell for particular services, communications, activities and/or operations in a wireless communication network. Specific examples of such resources described herein include evolved Multimedia Broadcast and Multicast Services (eMBMS), Observed Time Difference Of Arrival (OTDOA), Discontinuous Reception (DRX), Channel Quality Indicator (CQI), Scheduling Request (SR), but the present disclosure is not limited as such and is equally applicable to other types of resources which are periodically allocated to or configured for particular wireless devices or cells.

Resources (e.g. subframes) may be semi-statically allocated or configured by the eNB for the purpose of dedicated services, such as, broadcast/multicast services, e.g., MBMS, packet-forwarding to Relay Nodes (RNs), Almost-Blank Subframes (ABS) for supporting enhanced ICIC, Automatic Neighbor Relations (ANRs), OTDOA subframes for emergency (E911) services, eMBMS Reserved Cells, etc. In the latter case, Reserved Cells are cells configured within or adjacent to a Multicast Broadcast Single Frequency Network (MBSFN) Area (which Section 15 of 3GPP TS 36.300 version 12.3.0, herein incorporated by reference, defines as a group of cells within an MBSFN Synchronization Area of a network which are coordinated to perform MBSFN Transmissions). Except for MBSFN Area Reserved Cells, all cells within an MBSFN Area contribute to MBSFN Transmissions and advertise their availability. The UE may only need to consider a subset of the MBSFN Areas that are configured, i.e., when the UE knows which MBSFN Area applies for the service(s) the UE is interested in receiving.

To reduce or eliminate interference to an MBMS service, the subframes configured as MBSFN subframes in the MBSFN Area are left unused by the Reserved Cells. When other periodic resources are configured within Reserved Cell coverage, these "blank" sub frames have to be considered. The Reserved Cells are configured with an eMBMS subframe pattern but are not used for eMBMS or unicast traffic. 3GPP is currently discussing a new (pre-defined) format for these sub frames, referred as New Carrier Type (NCT). These subframes are envisioned to cater to the needs of future (upcoming) applications. However, even if those unused subframes are reformatted, they may nevertheless also conflict with other periodic resources.

Typically, the number of subframes allocated for an MBMS service will vary based on the required service load and the subframes may be configured across one or more radio frames in any order or pattern and either distributed across the frames or lumped into one radio frame. In the case of LTE, these dedicated (service-specific) subframes are indicated by the eNB to the UEs via Radio Resource Control (RRC) messages. For signalling efficiency, these service-specific subframes are typically defined by a bit pattern over a finite duration or period, usually expressed as a number of frames that repeat themselves periodically with a pre-defined periodicity. As an example, MBSFN subframes dedicated for broadcast/multicast services are defined to have a particular configuration specified in 3GPP TS 36.331 section 6.3.7 as follows:

```
-- ASN1START
MBSFN-SubframeConfig ::=        SEQUENCE {
    radioframeAllocationPeriod    ENUMERATED {n1, n2, n4, n8, n16,
                                  n32},
    radioframeAllocationOffset    INTEGER (0..7),
    subframeAllocation            CHOICE {
        oneFrame                  BIT STRING (SIZE(6)),
        fourFrames                BIT STRING (SIZE(24))
    }
}
-- ASN1STOP
```

Using the MBSFNAreaConfiguration message, the defined allocation pattern is periodically assigned to the MBMS service. The periodicity of the allocation is set by the parameter commonSF-AllocPeriod.

MBSFNAreaConfiguration Message

```
-- ASN1START
MBSFNAreaConfiguration-r9 ::=    SEQUENCE {
    commonSF-Alloc-r9            CommonSF-AllocPatternList-r9,
    commonSF-AllocPeriod-r9      ENUMERATED {rf4, rf8, rf16, rf32,
                                 rf64, rf128, rf256},
    pmch-InfoList-r9             PMCH-InfoList-r9,
    nonCriticalExtension         MBSFNAreaConfiguration-v930-IEs
                                 OPTIONAL
}
MBSFNAreaConfiguration-v930-1Es ::= SEQUENCE {
    lateNonCriticalExtension     OCTET STRING OPTIONAL,
    nonCriticalExtension         SEQUENCE { } OPTIONAL
}
CommonSF-AllocPatternList-r9 ::= SEQUENCE (SIZE (1..maxMBSFN-
                                        Allocations)) OF
                                 MBSFN-SubframeConfig
-- ASN1STOP
```

In this example, the subframeallocation element of the MBSFNConfiguration Information Element (IE) indicates the subframes which are dedicated to the broadcast services within one system frame or four system frames. This subframe assignment continues periodically with a period specified by the radioframeAllocationPeriod element, which, in this example, is expressed in terms of a number of frames. During these service-dedicated subframes, normal DL data transmission may be prohibited fully or partially (with some limited control signalling, such as PDCCH signalling which may be allowed).

Referring now to drawing figures in which like reference designators refer to like elements there is shown in FIG. 1 illustrates a wireless communication network 2 that uses periodic resources such as those described above, according to one embodiment of the present disclosure. In the embodiments described herein, the wireless communications network 2 is preferably a $4^{th}$ Generation (4G), $5^{th}$ Generation (5G), or some future generation of a 3GPP LTE communication network. As such LTE terminology is oftentimes used herein. However, it should be appreciated that the systems and methods disclosed herein are not limited to LTE but could apply to any wireless communication network in which resources are configured/allocated periodically.

As illustrated, the wireless communications network 2 includes a base station 6, a serving cell 4, and a wireless device 8, which in 3GPP LTE is referred to as a User Equipment (UE). The base station 6 may be a macro, or high power, base station, which in 3GPP LTE is referred to as an evolved Node B (eNB). The base station 6 may alternatively be a low power base station (e.g., a micro, pico, femto, or home eNB). Note that while the base station 6 is used in the embodiments described below, the embodiments are equally applicable to any radio access node with which resources can be configured/allocated periodically.

Figure 2:
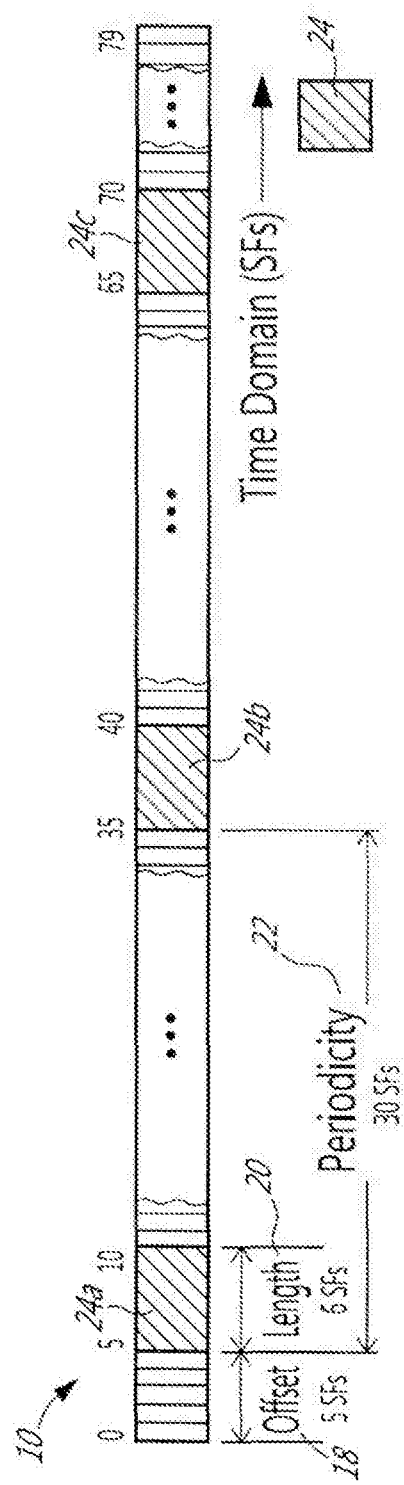
FIG. 2 illustrates an example of a timing diagram for a periodic resource.

FIG. 2 illustrates an example of a timing diagram 10 for a periodic resource 24 (e.g. an MBMS, DRX or a CQI resource) used in the wireless communication network 2 of FIG. 1. In this example, the periodic resource 24 is shown over an example time duration of 80 subframes (or SFs) and is defined by a set of attributes or parameters, which includes an offset 18, a length 20 and a periodicity 22 expressed as a function of subframes (SFs). Generally, the offset 18 is understood to be relative to a reference point (e.g. SF0) while the length 20 is the duration of a resource occurrence 24a, 24b, 24c or, in other words, a period during which the resource is allocated, assigned and/or used. Although periodic resources such as resource 24 could be defined by additional or different attributes, for clarity, the resource examples provided herein are described in relation to an offset, length and periodicity but it is understood that other possibilities exist for defining periodic resources. In the example of FIG. 2, the offset 18 is equal to 5 SFs while the length 20 is equal to 6 SFs. The periodicity 22, in this case is equal to 30 SFs and is defined as the length of time between two consecutive occurrences 24a, 24b, 24c of the resource 24. In other words, the resource 24 is set to "occur" with a periodicity of 30 SFs. In this example, each occurrence 24a, 24b, 24c is formed of a set of contiguous SFs that repeats over time but it is not limited to such pattern. For example, each occurrence 24a, 24b, 24c could instead have a non-contiguous pattern. More generally, a periodic resource may be viewed as any repeating pattern of resources (e.g. subframes), either contiguous or non-contiguous and with a periodicity equal to the length of time between two consecutive occurrences of the resource pattern.

Figure 3:
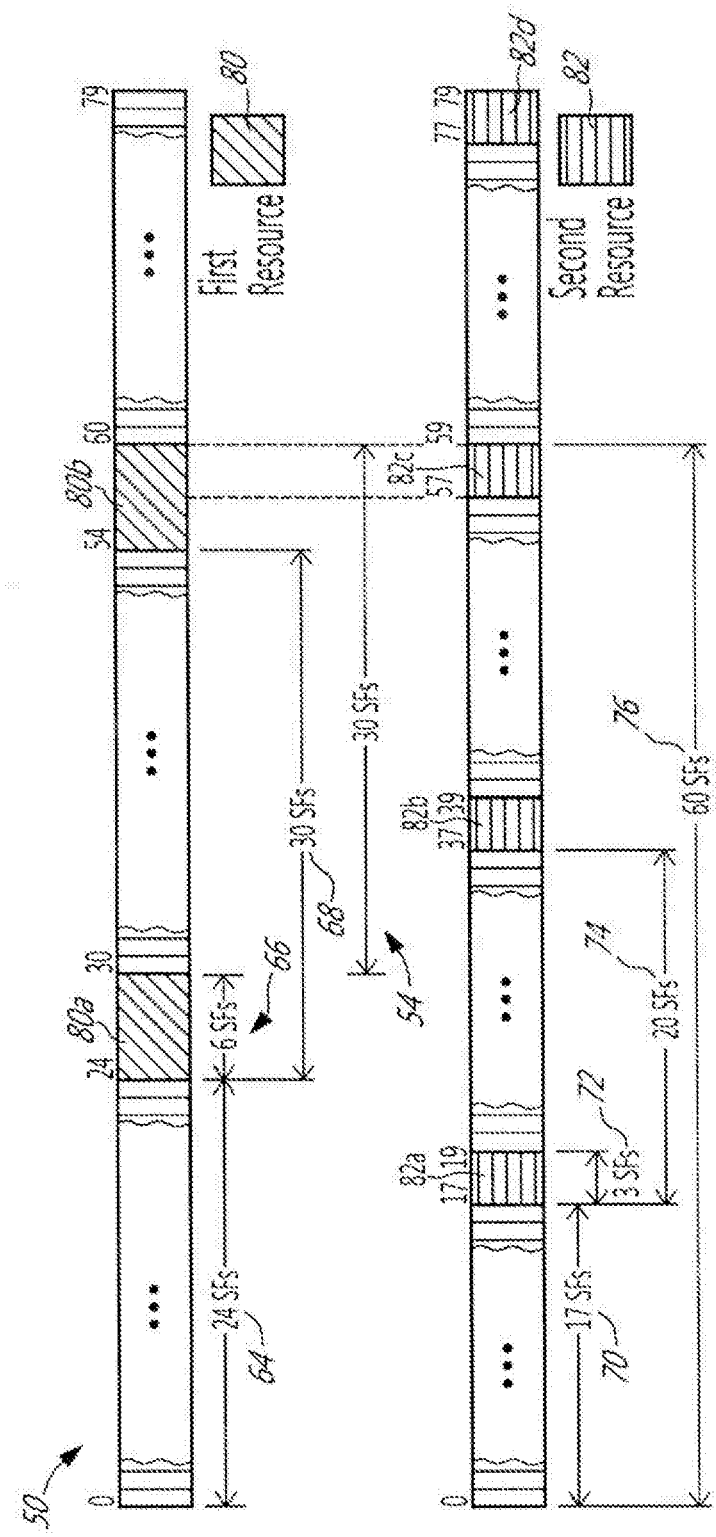
FIG. 3 is an example of a timing diagram showing a conflict between two periodic resources.

FIG. 3 is an example of a timing diagram 50 showing a conflict between first and second periodic resources 80, 82 over a period of 80 SFs or 8 frames. In this example, the first periodic resource 80 is defined (relative to SF0) with an offset 64 of 24 SFs, a length 66 of 6 SFs and a periodicity 68 of 30 SFs while the second periodic resource 82 is defined (also in relation to SF0) with an offset 70 of 17 SFs, a length 72 of 3 SFs and a periodicity 74 of 20 SFs. The first and second resources 80, 82 are shown to be in conflict only in the region of SF57 to SF60 ie between first resource occurrence 80b and second resource occurrence 82c. The rest of the occurrences shown (i.e. first resource occurrence 80a and second resource occurrences 82a, 82b, 82d) do not overlap.

As noted above, resource conflicts such as shown in FIG. 3 may be a problem, particularly when one or more of the conflicting resources cannot be reconfigured or are difficult to reconfigure to avoid the conflict. Examples of such resources include resources used for dedicated services (e.g. eMBMS, OTDOA, ANRs, Reserved Cells, etc.), semi-statically configured or pre-configured resources, etc. These resources may be referred to as "primary" resources or non-movable resources (e.g. resources that cannot be or are difficult to reconfigure to avoid a conflict).

Conflict Search

Figure 4:
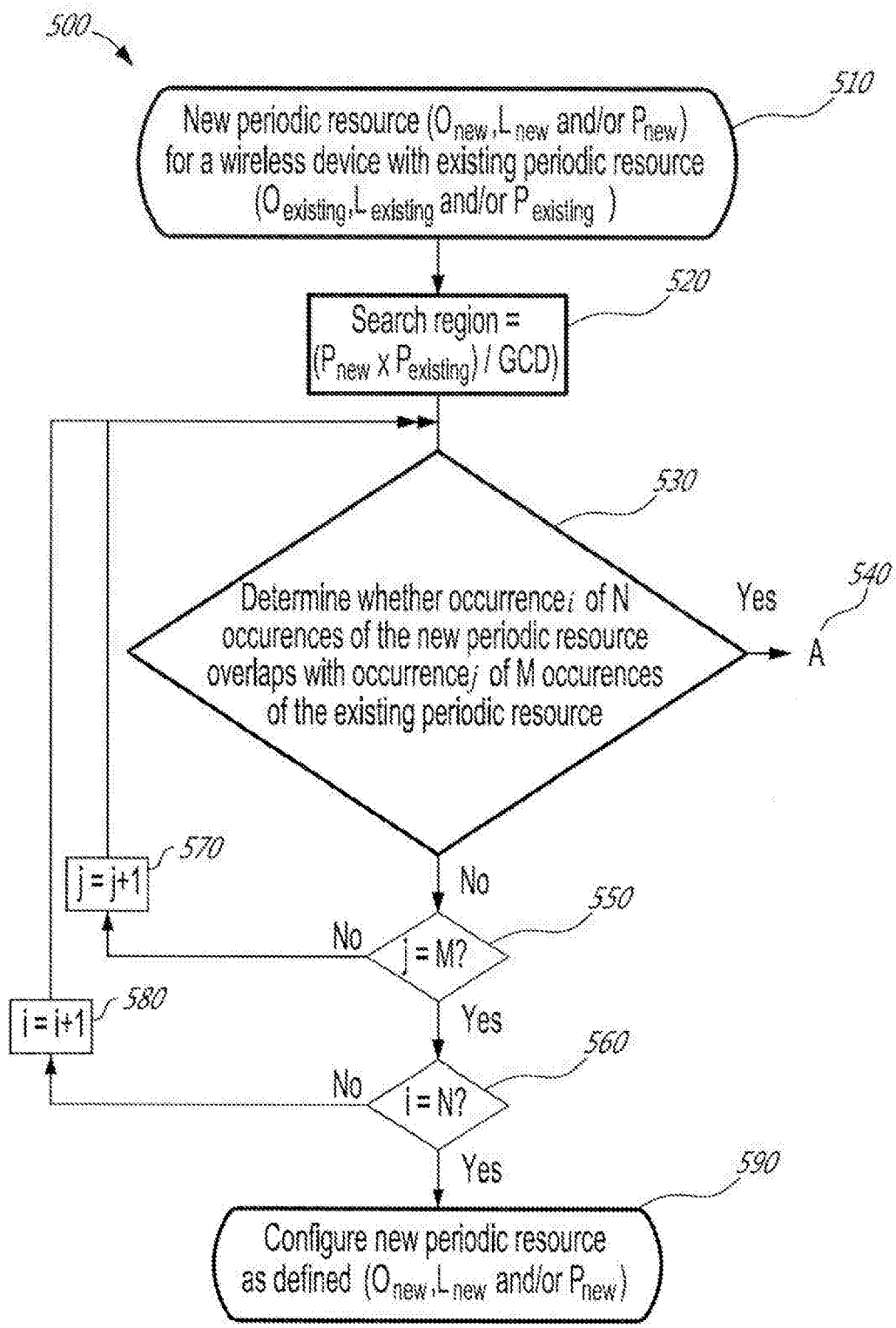
FIG. 4 is an example flow chart of a process for determining a conflict between a new and an existing periodic resource in accordance with principles of the present disclosure.

FIG. 4 is an example flow chart of a process 500 for determining a conflict between a new periodic resource and an existing periodic resource for a wireless device in accordance with principles of the present disclosure. Although the examples described in this and other Figures refer specifically to a new and an existing resource, it is not intended to be limited as such and generally applies to any type of periodic resource (whether new or existing) to determine possible conflicts. More generally, the example process can be used to determine possible conflicts between one periodic resource of interest (e.g a primary resource) which can either be new or existing and one or more other periodic (e.g. secondary or movable resources i.e. resources that may be more easily (re)configured) which can also either be new or existing. For simplicity however, the present example will be described in relation to a new and an existing periodic resource. Note that while FIG. 4 and some other figures described herein illustrate "steps", it should be noted that the term "steps" is not to be construed as requiring any particular ordering for the performance of the associated actions. In fact, the steps may be performed in any desired order unless a specific order is explicitly stated as being required or a specific ordering is otherwise required for operation. Further some of the steps may be performed simultaneously.

According to one embodiment, the example process is for a base station node in a wireless communication network (such as eNB 6 of FIG. 1). However, it could equally be for other nodes in the network, including wireless devices (e.g. UE 80 of FIG. 1) that may be configured to perform the search functions described herein.

Starting at step 510, a new (e.g. primary) periodic resource (e.g. defined with a given offset $O_{new}$, length $L_{new}$ and periodicity $P_{new}$) needs to be configured for a wireless device (e.g. a UE) that is already configured with an existing (e.g. secondary) periodic resource defined by offset $O_{existing}$, length $L_{existing}$ and periodicity $P_{existing}$. At step 520, a conflict search region may optionally be calculated, for example, based on the periodicities $P_{new}$ and $P_{existing}$ of the new and existing resources. In another example, the search region is a function of both $P_{new}$ and $P_{existing}$. In yet another example, the search region is calculated as a function of a product of $P_{new}$ and $P_{existing}$ and also optionally based on a Greatest Common Denominator (GCD) for $P_{new}$ and $P_{existing}$:

$$\text{Search Region} = (P_{new} * P_{existing})/\text{GCD} \qquad (1)$$

In that example, the search region is expressed as a number of subframes or SFs and extends from a reference point (e.g. SF0) to the value calculated based on (1). Using (1) for the example shown in FIG. 3 where the first resource periodicity is 30 SFs and the second resource periodicity is 20 SFs, the GCD would be 10 and the resulting (optimal) search region 76 would extend from SF0 to SF60 (calculated as (20*30 SFs)/10=60 SFs. In another example, if $O_{new}$ is used instead as a reference point, the search region would still be 60 SFs but in that case, the region would extend from $O_{new}$ and end at [60 SFs+$O_{new}$]. Other reference points can be used.

Generally, if the search region is calculated as noted above in (1) to determine if a conflict exists between two resources, the conflict will be found in that search region without having to consider a larger and/or other region(s). In that sense, the search region represents a "minimum" (or a more optimal) search window which may advantageously reduce complexity and/or processing time for determining the presence of a conflict between resources. As will be explained in greater detail below, resolving conflicts found in the search region operates to resolve all conflicts outside of the search region as well.

However, other implementations for the search region based on or corresponding to the resource periodicities may be used. For example, the search region for a new (e.g. primary) periodic resource with a periodicity $P_{new}$ and a plurality K of existing (e.g. secondary) resources, each with their respective periodicity $P_k$ (with k ranging from 1 to K) may be determined as follows:

$$\text{Search Region} = (P_{new} * \text{MAX}(P_k)/\text{GCD}_k)) \qquad (2)$$

In this example, $P_k$ is the periodicity of a existing resource k in the plurality K and $GCD_k$ is the GCD for $P_k$ and $P_{new}$. The search region extends from a reference point (e.g. SF0) to a point calculated based on (2) as the product of $P_{new}$ and the maximum value for $P_k/GCD_k$ where, as noted above, k ranges from 1 to K. In another example, if $O_{new}$ is used instead as a reference point, the search region would still be the value calculated based on (2) but in that case, the region would extend from $O_{new}$ and end at $[(P_{new} * \text{MAX}(P_k)/GCD_k))+O_{new}]$. Other reference points can be used and other implementations for calculating the search region are possible.

Returning to the example flow chart of FIG. 4, once the appropriate search region has been calculated, a check is done at step 530 to determine if there is a conflict. In this example, the new periodic resource is assumed to have N occurrences in the search region calculated and the existing periodic resource is assumed to have M occurrences. In the case of resources with non-contiguous patterns (e.g. with subframes distributed across one or more radio frames), each of the N and/or M occurrences may be formed of a set of non-contiguous subframes. The conflict check at step 530 is between each occurrence$_j$ of the N occurrences of the new periodic resource and each occurrence$_j$ of the M occurrences of the existing periodic resource. As shown in steps 550 and 570, this process is repeated for each occurence$_j$ (with the value of j compared to M and, if different, incremented by one) until occurrence$_i$ has been checked against each of the M occurrences of the existing periodic resource or until a conflict is determined at step 540 (further details below).

When all M occurrences have been checked at step 550 (when j=M), the process moves to steps 560 and 580 and repeats itself again for the next occurrence$_i$ of the N occurrences of the new periodic resource. When all N occurrences have been checked at step 1060 (when i=N), and none of the N occurrences of the new periodic resource conflicts with any (occurence$_j$) of the M occurrences of the existing periodic resource in the search region, the process moves to step 590 where it is assumed that the resources do not conflict within but also outside of the search region and the new periodic resource is configured as defined (with offset $O_{new}$, length $L_{new}$, periodicity $P_{news}$). If, on the other hand, a conflict between occurrence$_i$ and occurence$_j$ has been determined (at step 530), the process moves to point A in FIG. 5 (further details below) at step 540 where a reconfiguration of the existing periodic resource is attempted. Advantageously, the example process described above in relation to FIG. 4 is of a linear order and as a result, the number of conflict checks increases linearly with an increase of the number of resources to be evaluated for possible conflicts. This can be useful in environments where a large number of resources need to be configured and/or where the available processing capability for addressing conflicts is limited.

Once a conflict between two resources (e.g. a primary and a secondary resource) has been determined, the conflicting (secondary) resource may be configured or reconfigured (if already configured) at a conflict-free position in the search region.

(Re) Configuration

Figure 5:
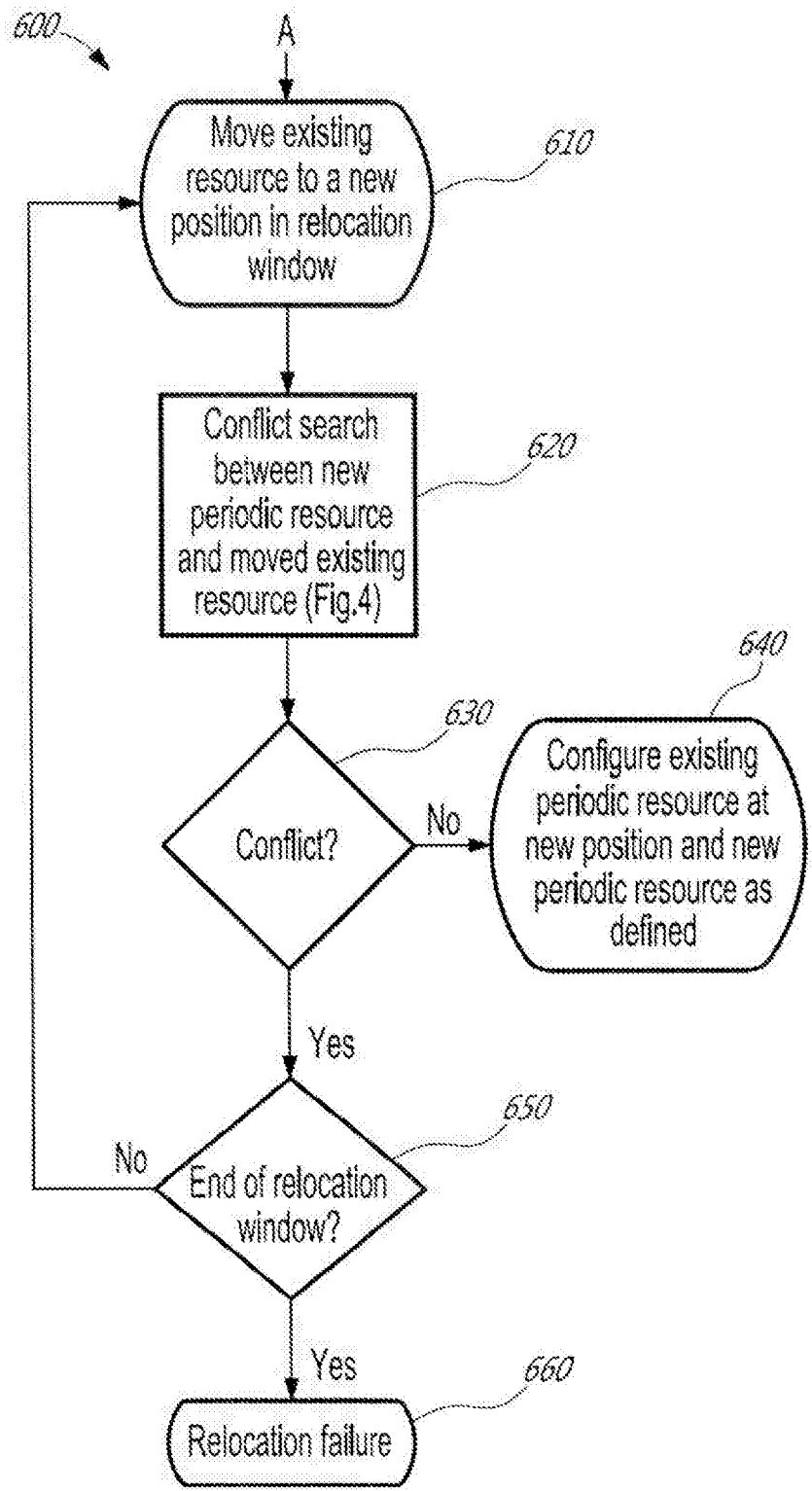
FIG. 5 is an example flow chart of a process for configuring an existing periodic resource at a new position in accordance with principles of the present disclosure.

In accordance with principles of the present disclosure, an example flow chart of a configuration process 600 for configuring (or reconfiguring) the existing periodic resource of FIG. 4 to a new position is shown in FIG. 5. According to one embodiment, the example process is for a base station node in a wireless communication network (such as eNB 6 of FIG. 1) but it could equally be for other nodes in the network, including wireless devices (e.g. UE 8 of FIG. 1) that may be configured to perform the configuration functions described herein.

Starting at point A (from FIG. 4) and into step 610, the existing resource is moved to a new position. In one example, the existing resource is moved to a new position within a period of the existing resource in the search region (referred herein as a relocation window). In that example, the relocation window is expressed as a number of subframes or SFs and extends from a reference point (e.g. the existing resource offset $O_{existing}$) to a value corresponding to a period of the existing resource. Using the example shown in FIG. 3 and assuming the first resource 80 is the existing resource, the relocation window 54 would extend from SF24 to SF53 which corresponds to a period of the first resource 80. Other reference points and other implementations for the relocation window are possible.

Referring back to the example process of FIG. 5, it is to be noted that the existing resource may alternatively be moved to a different position in the search region or in another region. Once the existing resource has been relocated (by for example, increasing or decreasing the resourse's offset $O_{existing}$), a conflict search is performed at step 620 (using for example the process of FIG. 4) to determine whether there is a conflict between occurrences the new periodic resource and occurrences of the existing resource relocated at the new position. If at step 630, no conflict is determined and if a search region as described above is used, it can be inferred that the resources no longer conflict within the search region and based on the periodic nature of the resources, it can also be inferred that the resources do not conflict outside the search region. At that point, the process moves to step 640 where the new periodic resource is configured as initially defined (e.g. with offset $O_{new}$, length $L_{new}$, periodicity $P_{new}$) and the existing resource is reconfigured as relocated at the new position (e.g. with length $L_{existing}$, periodicity $P_{existing}$ but with a modified offset $O_{modified}$ corresponding to the new position). If a conflict is determined at step 630, the process moves to step 650 where a determination as to whether the new position is at the end of the relocation window. If not, the process goes back to step 610 and repeats itself with the existing resource moved to yet another position in the relocation window. Specifically, once the existing resource has been relocated, a conflict search is performed at step 620 (using for example the process of FIG. 4) to determine whether there is a conflict between occurrences the new periodic resource and occurrences of the existing resource relocated at the new position. If no conflict is determined at step 630 and if a search region as described above is used, it can be inferred that the resources no longer conflict within but also outside of the search region based on the periodic nature of the resources and the process moves to step 640 where new period resource is configured as initially defined and the existing resource is reconfigured as relocated at the new position.

If a conflict is detected at step 630 with the existing resource located at a particular position, the process is repeated at step 650 with the existing resource relocated at a new position until no conflict is found (step 640) or until all of the available positions within the relocation window have been tried (650). When all of the available positions within the relocation window have been tested (step 650), and none of available positions is conflict-free, the process moves to step 660 and may provide a relocation failure indication (e.g. an indication that the existing resource cannot be moved to a conflict-free position).

According to the principles of the present disclosure, the above conflict search and configuration example processes are performed every time a resource in a group of resources needs to be relocated as a result of a conflict with some other resource in the group. In a scenario where only two resources are considered (e.g. the new and existing resources of FIG. 4), the search and configuration processes may only need to be used once. However, in a scenario where multiple resources in a group of resources are considered, the search and relocation processes may need to be used multiple times to ensure a (e.g. secondary) resource relocated as a result of a conflict with another (primary) resource in the group does not also conflict with any of the other resources in the group. For example, in a scenario with a new resource and a plurality K of existing resources, every time one of the plurality K of existing resources is relocated as a result of a conflict with, for example, the new resource, a conflict search is performed between the relocated resource and each of the other existing resources in the plurality K of existing resources to ensure the initial relocation has not inadvertently resulted in a new conflict with some other resource in the plurality K of existing resources. If a new conflict is determined, the search and configuration processes are repeated again for each new relocation. If no new conflict is found, the relocated resource is (re)configured at the conflict-free position and the new resource is configured as initially defined.

Figure 6:
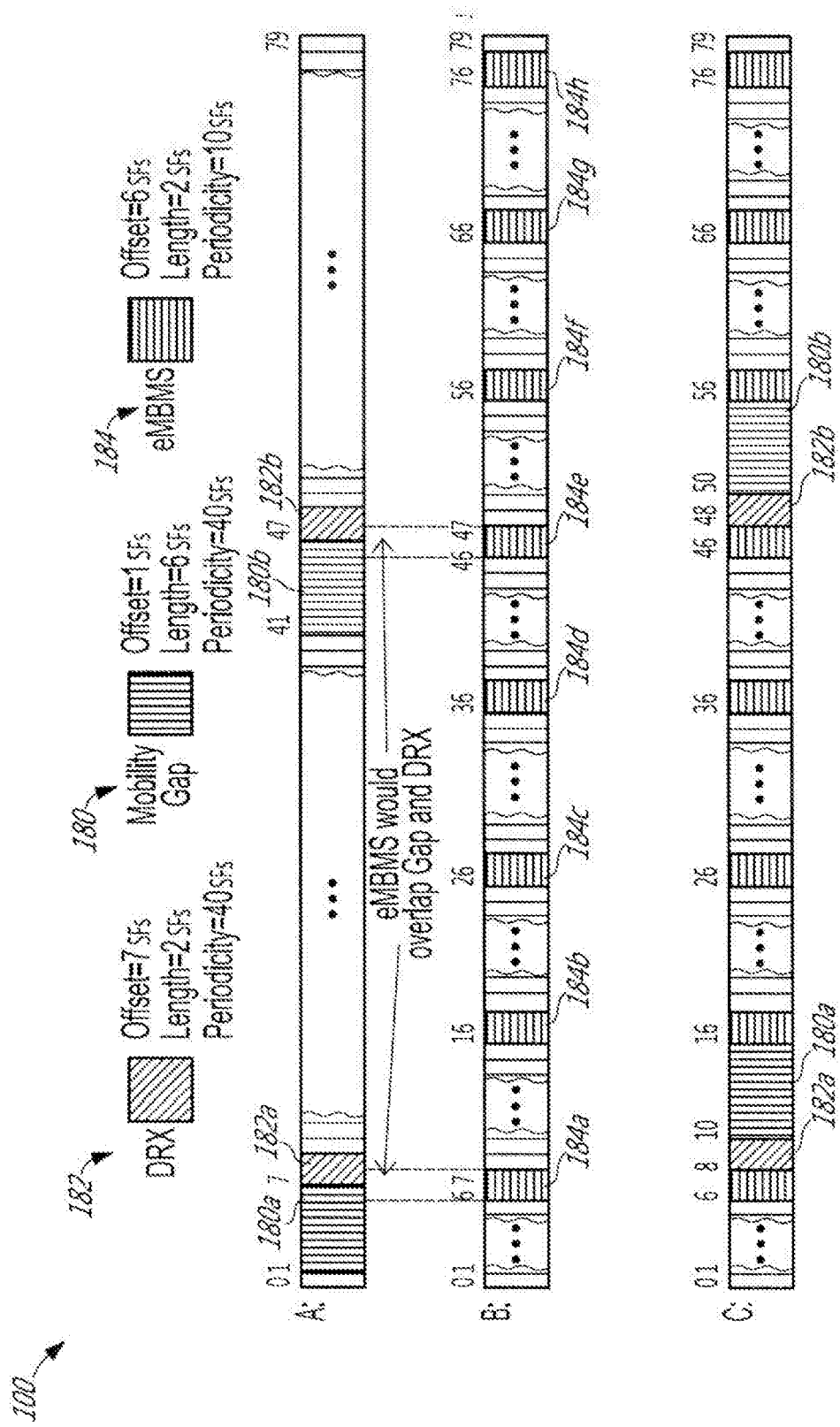
FIG. 6 is an example of a timing diagram showing the relocation of Discontinuous Reception (DRX) and Mobility Gap resources as a result of a conflict with an Evolved Multimedia Broadcast Multicast Server (eMBMS) resource in accordance with principles of the present disclosure.

According to the principles of the present disclosure, the conflict search and configuration process examples described above in relation to FIGS. 4 and 5 can be used in a variety of scenarios to determine and address the presence of conflicts between periodic resources and (re)configure resources accordingly. Turning now to FIG. 6, illustrated is an example of a timing diagram 100 showing yet another example of a conflict scenario that can be determined and resolved using the processes described above. In this example, the conflict is between existing (e.g. already configured) mobility gap and DRX resources 180, 182 and a new eMBMS resource 184 to be established for a connected UE. The mobility gap and DRX resources 180, 182 are shown in time sequence A while the eMBMS resource 184 is shown in time sequence B with both time sequences A, B covering a period of 80 SFs or 8 frames with SF 0 (or SF0) as a reference point. In this example, the mobility gap resource 180 is defined (relative to SF0) with an offset of 1 SF, a length of 6 SFs and a periodicity of 40 SFs while the DRX resource 182 is defined (also in relation to SF0) with an offset of 7 SFs, a length of 2 SFs and a periodicity of 40 SFs. In time sequence A, the mobility gap and DRX resources 180, 182 are shown to be conflict-free relative to one another but when considering time sequence B, the mobility gap and DRX resources 180, 182 are shown to be in conflict with the eMBMS resource 184 in SF6, SF7, SF46 and SF47. In other words, mobility gap occurrences 180a, 180b are shown to be in conflict with eMBMS occurrences 184a, 184e in SF6 and SF46 respectively while DRX occurrences 182a, 182b are shown to be in conflict with the same eMBMS occurrences 184a, 184e but in SF7 and SF47. In this example, the rest of the eMBMS occurrences shown (e.g. occurrences 184b, 184c, 184d, 184f, 184g and 184h) do not overlap.

Using the configuration process example described above in relation to FIG. 5, the conflicts noted above can each be addressed by relocating and (re)configuring the existing mobility gap and DRX resources 180, 182 to a conflict-free position so that they do not conflict with one another and with the new eMBMS resource 184. The result of the (re)configuration process is shown in time sequence C of FIG. 6. Specifically, in that sequence C, mobility gap occurrences 180a, 180b are shown relocated (relative to time sequence A) to conflict-free positions denoted from SF10-SF15 and SF50-SF55 respectively. Similarly, DRX occurrences 182a, 182b are shown relocated (also relative to time sequence A) to conflict-free positions denoted from SF8-SF9 and SF48-SF49 respectively.

Base Station Node Conflict Management

Figure 7:
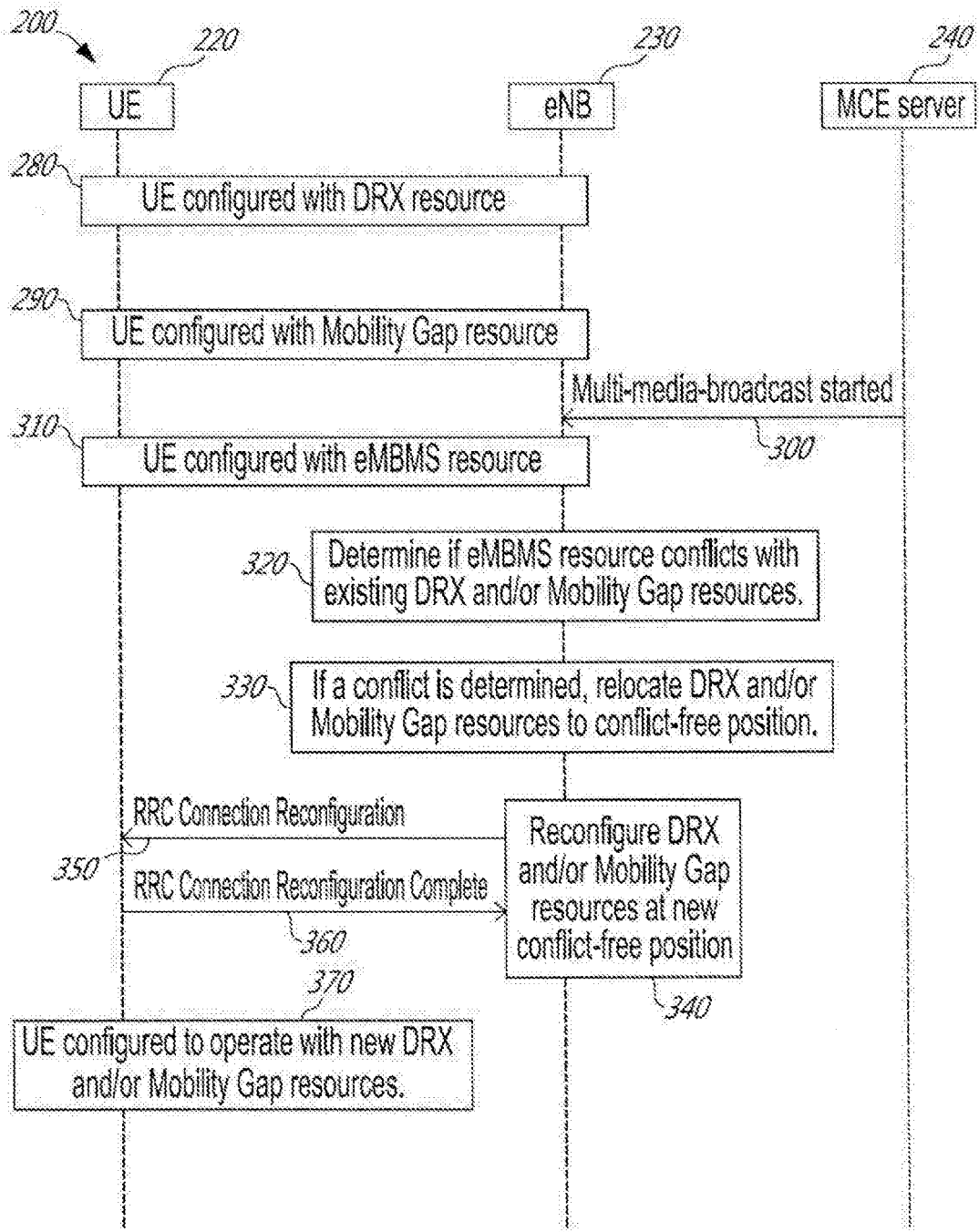
FIG. 7 is a signaling diagram example of a method for reconfiguring DRX and Mobility Gap resources as a result of a conflict with an eMBMS resource in accordance with principles of the present disclosure.

Turning now to FIG. 7 illustrated is a signaling diagram example 200 of a method for a base station node (e.g. an eNB 230) for reconfiguring DRX and Mobility Gap resources for a wireless device (e.g. a UE 220) when a conflict exists with an eMBMS resource based on a resource conflict search and relocation performed at the network node. In this example, the UE 220 is initially configured by the eNB 230 with a DRX resource at step 280, typically while or shortly after the UE 220 connects to the eNB 230. At step 290, the UE 220 is then configured by the eNB with a Mobility Gap resource. Although not shown, the UE 220 may also be configured with additional resources such as, for example, an SR resource, a CQI resource, or other (secondary) resources. For any (secondary) resource to be configured (e.g. in this case the DRX and Mobility Gap resources), a configuration or setup message or some other message is used by the eNB 230 to signal the appropriate resource parameters to the UE 220 (e.g. offset, length and periodicity). Note that in this example, the DRX and Mobility Gap resources are shown to be configured separately but other possibilities exist such as for example, configuring the resources together using common configuration messages (not shown).

At step 300, a Multi-cell/multicast Coordination Entity (MCE) server 240 sends a message (e.g. a multi-media-broadcast started message) to the eNB 230 instructing the eNB 230 to allocate certain resources for an upcoming eMBMS service or session intended for a group of participating cells (ie an MBMSN area) that includes the cell associated with the eNB 230. As is well-known, the MCE server 240 is configured to decide both the radio resources that are used for the MBMS service as well as the details of the radio resource configuration. As a result, the multi-media-broadcast started message may include appropriate resource parameters (e.g. offset, length and/or periodicity) for the eNB 230 to properly configure the eMBMS resource for UEs within its coverage area. In response, the eNB 230 configures an eMBMS resource for the eMBMS service as instructed by the MCE server 240 and broadcasts the corresponding eMBMS resource parameters (e.g. offset, length and/or periodicity) via a broadcast message (e.g. in a MBSFN SubframeConfiguration Information Element of a System Information Block 2 (SIB2) broadcast message) for UEs within its coverage area. This process is exemplified at step 310 where at that point, the UE 220, like other UEs in the cell coverage of the eNB 230 can receive the broadcast eMBMS information and if it has the appropriate subscription, can decide to join the eMBMS service being established.

In this particular example, it is important to note that once the eMBMS resource is configured, all UEs within the coverage area of the eNB 230 will be impacted regardless of whether they join the eMBMS service or not. In other words, all UEs in the cell are "configured" with the eMBMS resource, not just subscribing UEs or UEs that have actually joined the eMBMS service. For clarity, step 310 showing the UE 220 being "configured with an eMBMS resource" is intended in this example to be illustrative of a broadcast configuration or a configuration for all UEs in the cell, not just the UE 220. Generally however, step 310 is intended to be illustrative of any manner in which resources may be configured for UEs in the coverage area of the eNB 230, whether by way of a broadcast or unicast transmissions.

Continuing with the example of FIG. 7, at step 320, the eNB 230 determines whether a conflict exists between the new eMBMS resource and any of the existing DRX and/or the Mobility Gap resources using the conflict search described above in relation to FIG. 4. If, at step 330, a conflict exists, the eNB 230 relocates either the DRX and/or the Mobility Gap resources to a conflict-free position using the relocation process described above in relation to FIG. 5. If any of the DRX and/or Mobility Gap resources have been relocated, the eNB 230 at step 340 reconfigures the relocated resource by for example sending an RRC ConnectionReconfiguration message (step 350) to the UE 220 which contains the parameters for the reconfigured resource (e.g. a drxConfig parameter for DRX reconfiguration and/or a measGapConfig parameter for Mobility Gap reconfiguration) and receiving an RRC ConnectionReconfiguration-Complete message from the UE 220 that acknowledges completion of the reconfiguration. With the reconfigured DRX and/or Mobility Gap resources, the UE is configured at step 370 to operate with DRX and/or Mobility Gap resources that do not conflict with the new eMBMS resource.

Figure 8:
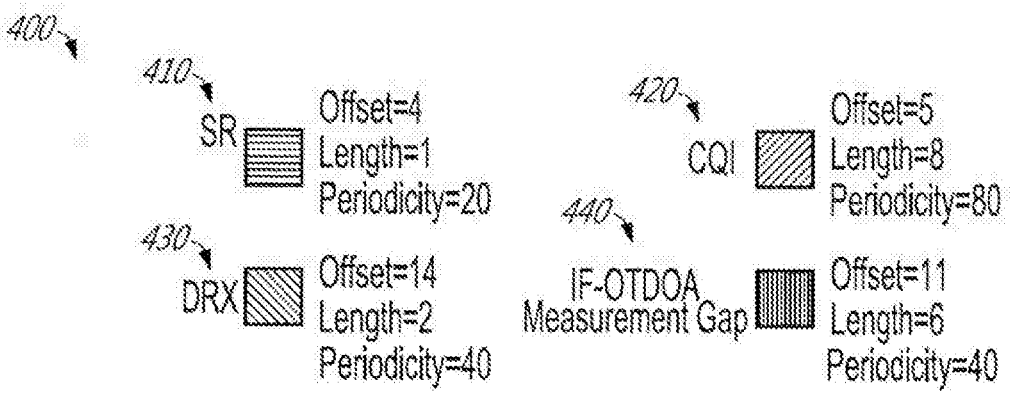
FIG. 8 is an example of a timing diagram showing the relocation of a DRX, Channel Quality Indicator (CQI) and Scheduling Request (SR) resources as a result of a conflict with an Inter-Frequency-Observed Time Difference of Arrival (IF-OTDOA) resource in accordance with principles of the present disclosure.
Figure 8:
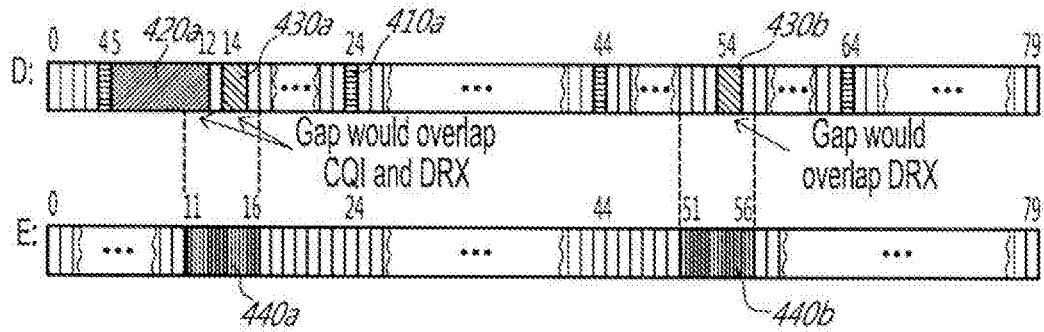
Figure 8:
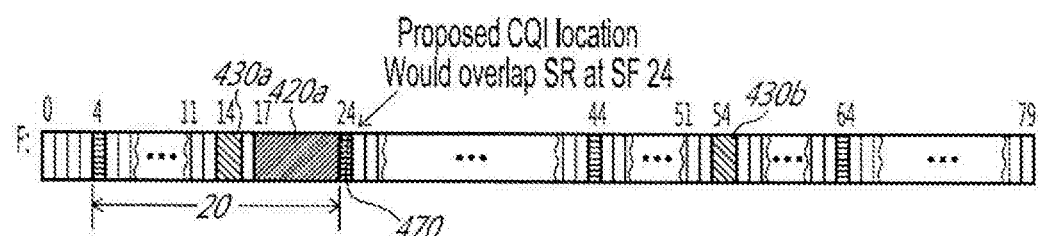
Figure 8:
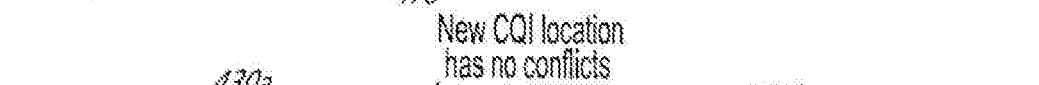
Figure 8:
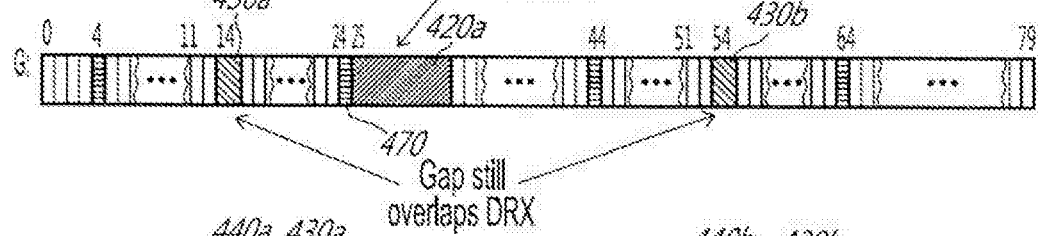
Figure 8:
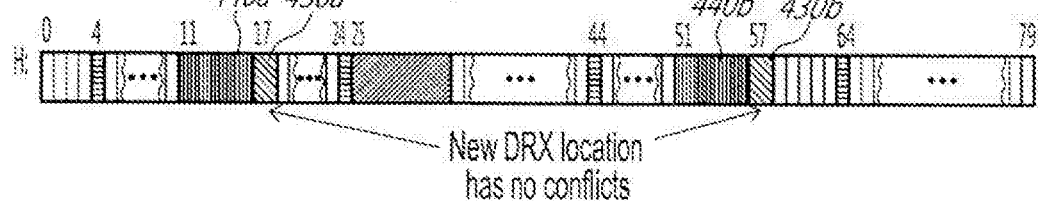

FIG. 8 is an example timing diagram 400 showing yet another example of a conflict scenario that can be determined and resolved using the processes described above in relation to FIGS. 4 and 5. In this example, the conflict is between existing (ie already configured) CQI and DRX resources 420, 430 for a connected UE in a serving cell and a new Inter-Frequency (IF)-OTDOA measurement gap resource 440 required for the UE to perform IF-OTDOA measurements in a neighbor cell. In addition, a non-conflicting (and already configured) SR resource 410 is also shown. The SR, CQI and DRX resources 410, 420, 430 are shown in time sequence D while the new IF-OTDOA resource 440 is shown in time sequence E with both time sequences D and E extending over a period of 80 SFs or 8 frames with SF 0 (or SF0) as a reference point. In this example, the SR resource 410 is defined (relative to SF0) with an offset of 4 SF, a length of 1 SF and a periodicity of 20 SFs, the CQI resource 420 is defined (also in relation to SF0) with an offset of 5 SFs, a length of 8 SFs and a periodicity of 80 SFs while the DRX resource 430 is defined (also relative to SF0) to have an offset of 14 SFs, a length of 2 SFs and a periodicity of 40 SFs. In time sequence D, the SR, CQI and DRX resources 410, 420 and 430 are shown to be conflict-free relative to one another but when considering time sequence E, the CQI and DRX resources 420, 430 are shown to be in conflict with the IF-OTDOA resource 440 in SF11, SF12, SF14, SF15, SF54, and SF55. In other words, CQI occurrence 420a is shown to be in conflict with IF-OTDOA occurrence 440a in SF11 and SF12 while DRX occurrences 430a, 430b are shown to be in conflict with IF-OTDOA occurrences 440a, 440b but in SF14, SF15 and SF54, SF55 respectively.

Using the configuration process example described above in relation to FIG. 5, the conflicts noted above can each be addressed by relocating and (re)configuring the existing CQI and DRX resources 420, 430 to a conflict-free position so that they do not conflict with one another or with the new IF-OTDOA resource 440 to be configured. Time sequence F of FIG. 8 shows the result of a first relocation iteration where the CQI resource 420 is relocated as a result of the conflict check. Specifically, in that sequence F, CQI occurrence 420a is shown relocated to a new position denoted by SF17-SF24 (relative to time sequence D). After this first relocation, another conflict check is performed (e.g. step 620 of FIG. 5) between the IF-OTDOA resource 440 and the relocated CQI resource 420 as well with existing SR and DRX resources 410, 430. Time sequence F shows a new conflict exists between relocated CQI occurrence 420a and SR occurrence 410a at SF24 but also that DRX occurrences 430a, 430b continue to conflict with IF-OTDOA occurrences 440a, 440b respectively. Time sequence G shows the result of a second relocation iteration where the CQI resource 420 is relocated (relative to time sequence F) to yet another position with CQI occurrence 420a shown in SF25-SF32. After this second relocation, another conflict check is performed (e.g. step 620 of FIG. 5) between the IF-OTDOA resource 440 and the relocated CQI resource 420 as well with existing SR and DRX resources 410, 430. Time sequence G shows that the CQI-SR conflict no longer exists but that DRX occurrences 430a, 430b continue to conflict with IF-OTDOA occurrences 440a, 440b respectively. Time sequence H shows the result of a third relocation iteration where the DRX resource 430 is relocated to another position (relative to time sequence G) with DRX occurrences 430a, 430b shown in SF17-SF18 and SF57, SF58 respectively. After this third relocation, another conflict check is performed (e.g. step 620 of FIG. 5) and a determination is made that there is no conflict between the IF-OTDOA resource 440 and the relocated DRX resource 430 as well as with existing SR and relocated CQI resources 410, 420.

Figure 9:
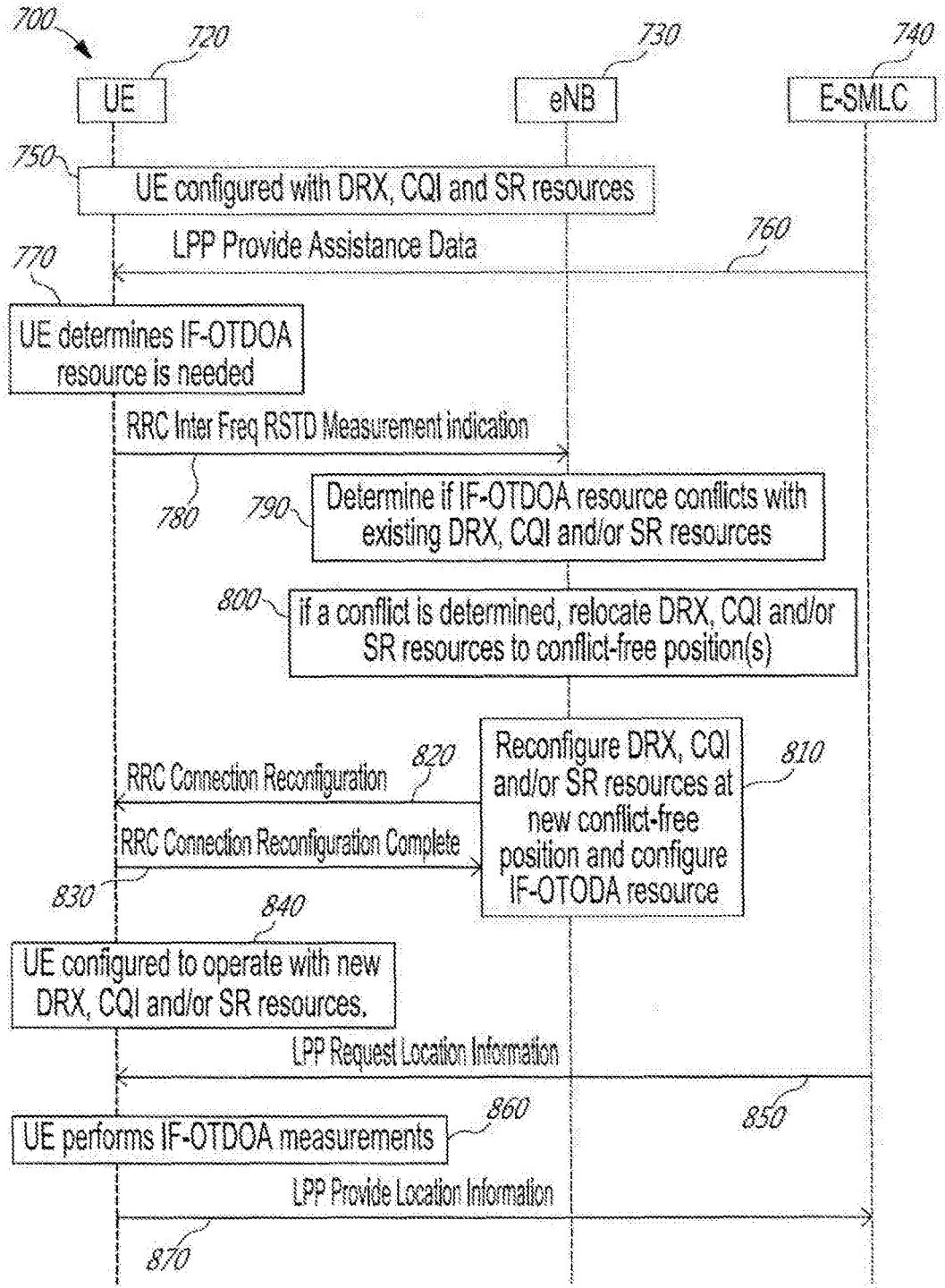
FIG. 9 is a signaling diagram example of a method for reconfiguring DRX, CQI and SR resources as a result of a conflicting IF-OTDOA resource, in accordance with principles of the present disclosure.

FIG. 9 illustrates a signaling diagram example 700 of a method for reconfiguring a DRX, CQI and/or SR resource (such as those shown in FIG. 8) for a wireless device, in this case UE 720, in accordance with principles of the present disclosure when a conflict exists with an IF-OTDOA resource. In this example, the UE 720 is initially configured by an eNB 730 with DRX, CQI and SR resources at step 750 (e.g. while or shortly after the UE 220 connects to the eNB 730). The DRX, CQI and SR resources are shown configured together but they could also be configured by the eNB 730 in separate steps, with one or more configuration messages or some other message(s) to signal the appropriate resource parameters to the UE 720 (e.g. offset, length and periodicity).

At step 760, an Evolved-Serving Mobile Location Center (E-SMLC) 740 configured to use an LTE Positioning Protocol (LPP) for UE positioning in an LTE network sends an LPP Provide Assistance Data message to the UE 720 (e.g. typically to determine UE positioning for emergency services) providing frequency and timing information necessary for the UE to perform inter-frequency measurements on neighbor cell reference signals. Based on the message received, the UE 720 determines at step 770 that an IF-OTDOA resource (e.g. a measurement gap) is needed to perform the desired measurements and sends a message to the eNB 730 (an RRC InterFreqRSTDMeasurementIndication message for example) requesting a specific IF-OTDOA resource (e.g. with a defined offset, length and/or periodicity). At step 790, the eNB 730 determines whether a conflict exists between the new IF-OTDOA resource as requested and any of the existing DRX, CQI and/or SR resources using the conflict search described above in relation to FIG. 4. If, at step 800, a conflict exists, the eNB 730 relocates the conflicting DRX, CQI and/or SR resources to a conflict-free position using the relocation process described above in relation to FIG. 5. If any of the DRX, CQI and/or SR resources have been relocated, the eNB 730 at step 810 reconfigures the relocated resource by for example sending an RRC ConnectionReconfiguration message (step 820) to the UE 720 which contains the parameters for the reconfigured resource (e.g. a drxConfig parameter for DRX reconfiguration, cqiReportConfig for CQI reconfiguration, and/or scheduling RequestConfig for SR reconfiguration). The same or a different RRC configuration message can be used to send the appropriate IF-OTODA parameters in an Information Element (e.g. measGapConfig) to also configure the IF-OTDOA resource at the UE 720. Once all of the resources have been (re)configured, the UE sends an RRC ConnectionReconfigurationComplete message to the eNB 730 at step 830 that acknowledges completion of the (re)configuration. With the reconfigured DRX, CQI and/or SR resources, the UE 720 is configured at step 840 to operate with DRX, CQI and/or SR resources that do not conflict with the new IF-OTDOA resource. Also, with the IF-OTDOA resource properly configured, the UE 720 is able to respond to LPP Request Location Information messages received from the E-SMLC server 740 at step 850 by performing inter-frequency (e.g. OTDOA) measurements at step 860 and sending the measurements to the E-SMLC server 740 via an LPP Provide Location Information message at step 870.

In the example of FIG. 9, the UE 720 is shown to be configured with the new IF-OTDOA resource at step 810 after resolving conflicts between resources (steps 790, 800) but it is understood that the IF-OTODA resource may be configured before conflicts are resolved. Other permutations changing the order in which conflicts are resolved and resources are configured are also possible and within the scope of the present disclosure.

Wireless Device Node Conflict Management

Figure 10:
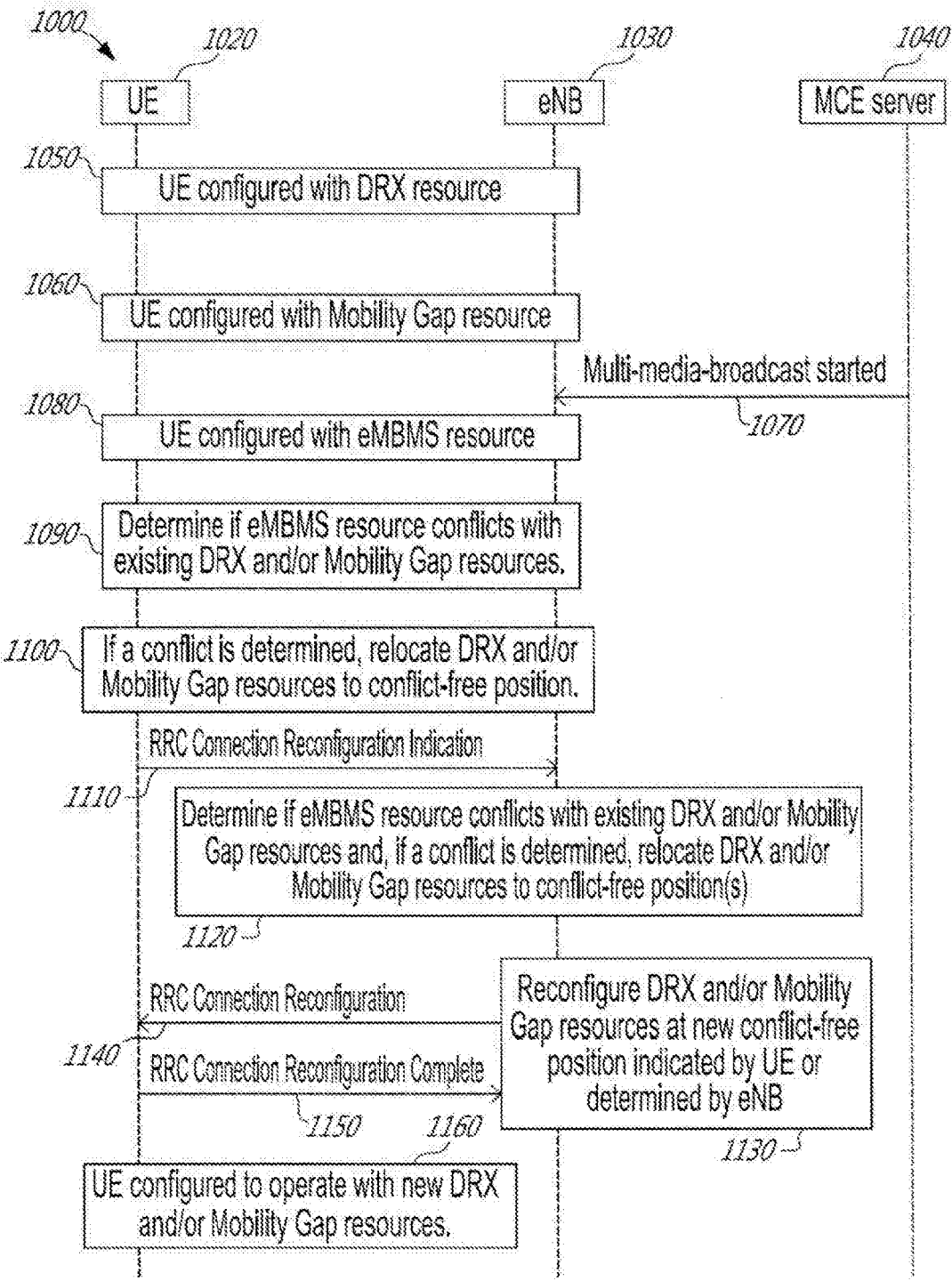
FIG. 10 is a signaling diagram of another method for reconfiguring DRX and Mobility Gap resources as a result of a conflict with an eMBMS resource in accordance with principles of the present disclosure.

The examples described so far in connection with FIGS. 7 and 9 assume that the network node (such as eNBs 230, 730) is configured to search and relocate resources to resolve conflicts. However, other implementations are possible. For example, FIG. 10 shows a variant of the eMBMS example described above in relation to FIG. 7 where a wireless device node (e.g. UE 1020) is configured to perform a conflict search to find conflict-free positions for resources conflicting with an eMBMS resource. Specifically in this example, the UE 1020 is initially configured by an eNB 1030 with a DRX resource at step 1050, typically while or shortly after the UE 1020 connects to the eNB 1030. At step 1060, the UE 1020 is then configured by the eNB with a Mobility Gap resource. Although not shown, the UE 1020 may also be configured with additional resources such as, for example, an SR resource, a CQI resource, or other (secondary) resources. For any (secondary) resource to be configured (e.g. in this case the DRX and Mobility Gap resources), a configuration or setup message or some other message is used by the eNB 1030 to signal the appropriate resource parameters to the UE 1020 (e.g. offset, length and periodicity). Note that in this example, the DRX and Mobility Gap resources are shown to be configured separately but other possibilities exist such as for example, configuring the resources together using common configuration messages (not shown).

At step 1070, an MCE server 1040 sends a message (e.g. a multi-media-broadcast started message) to the eNB 1030 instructing the eNB 1030 to allocate certain resources for an upcoming eMBMS service or session intended for a group of participating cells which, as noted above in relation to the example of FIG. 7 may include appropriate resource parameters (e.g. offset, length and/or periodicity) for the eNB 1030 to properly configure the eMBMS resource for UEs within its coverage area. In response, the eNB 1030 configures an eMBMS resource for the eMBMS service as instructed by the MCE server 1040 and broadcasts the corresponding eMBMS resource parameters (e.g. offset, length and/or periodicity) via a broadcast message (e.g. a SIB2 broadcast message) for UEs within its coverage area. This process is exemplified at step 1080 where at that point, the UE 1020, like other UEs in the cell coverage of the eNB 1030 can receive the broadcast eMBMS information and if it has the appropriate subscription, can decide to join the eMBMS service being established.

Similarly to the example shown in FIG. 7, step 1080 showing the UE 1020 being "configured with an eMBMS resource" is intended in this example to be illustrative of a broadcast configuration or a configuration for all UEs in the cell, not just the UE 1020. Generally however, step 1080 is intended to be illustrative of any manner in which resources may be configured for UEs in the coverage area of the eNB 1030, whether by way of a broadcast or unicast transmissions. Also, in the example of FIG. 10, the UE 1020 is shown to be configured with the new eMBMS resource before any resource conflict check is performed (further details below). This scenario may be applicable where, for example, it is desirable to avoid delays in in the establishment of the eMBMS service or session. However, it may be desirable to wait until the conflict and relocation processes have been completed before configuring the eMBMS resource. Other permutations changing the order in which conflicts are resolved and resources are configured are also possible.

At step 1090, the UE 1020 determines whether a conflict exists between the new eMBMS resource and any of the existing DRX and/or the Mobility Gap resources using the conflict search described above in relation to FIG. 3. If, at step 1100, a conflict exists, the UE 1020 finds a conflict-free position for the conflicting DRX and/or the Mobility Gap resources using the relocation process described above in relation to FIG. 5. If a conflict-free position is found, the UE 1020 at step 1110 sends a message to the eNB 1030 indicating a proposed reconfiguration of the conflicting DRX and/or Mobility Gap resources. The example message shown at step 1110 is a new RRC message (e.g a Connection ReconfigurationIndication message) which contains parameters for the reconfigured resource (e.g. a drxConfig parameter for DRX reconfiguration and/or a measGapConfig parameter for Mobility Gap reconfiguration) but the example is not limited as such and other new or existing messages (e.g. an RRC UpLink information Transfer message) could be used for that purpose. Once it receives a message from the UE 1020 indicating a proposed reconfiguration for the conflicting DRX and/or Mobility Gap resource(s), the eNB 1030 can reconfigure the conflicting resources. In another embodiment, the eNB 1030 may optionally decide at step 1120 to run its own conflict search and relocation to resolve the conflict(s). In that scenario, if it finds a conflict, the eNB 1030 would relocate the conflicting resources to conflict-free position(s) which may or may not be the same as the conflict-free positions proposed by the UE 1020.

In either case, the eNB 1030 reconfigures the conflicting DRX and/or Mobility Gap resource(s) at step 1130 at new conflict-free positions based on either the proposed reconfiguration received from the UE 1020 at step 1110 or based on its own determination. In one embodiment, the eNB 1030 reconfigures the conflicting resource(s) by sending an RRC ConnectionReconfiguration message (step 1140) to the UE 1020 with parameters for the reconfigured resource (e.g. a drxConfig parameter for DRX reconfiguration and/or a measGapConfig parameter for Mobility Gap reconfiguration) and receiving an RRC ConnectionReconfigurationComplete message from the UE 1020 that acknowledges completion of the reconfiguration. With the reconfigured DRX and/or Mobility Gap resources, the UE is configured at step 1160 to operate with DRX and/or Mobility Gap resources that do not conflict with the new eMBMS resource allocated.

Figure 11:
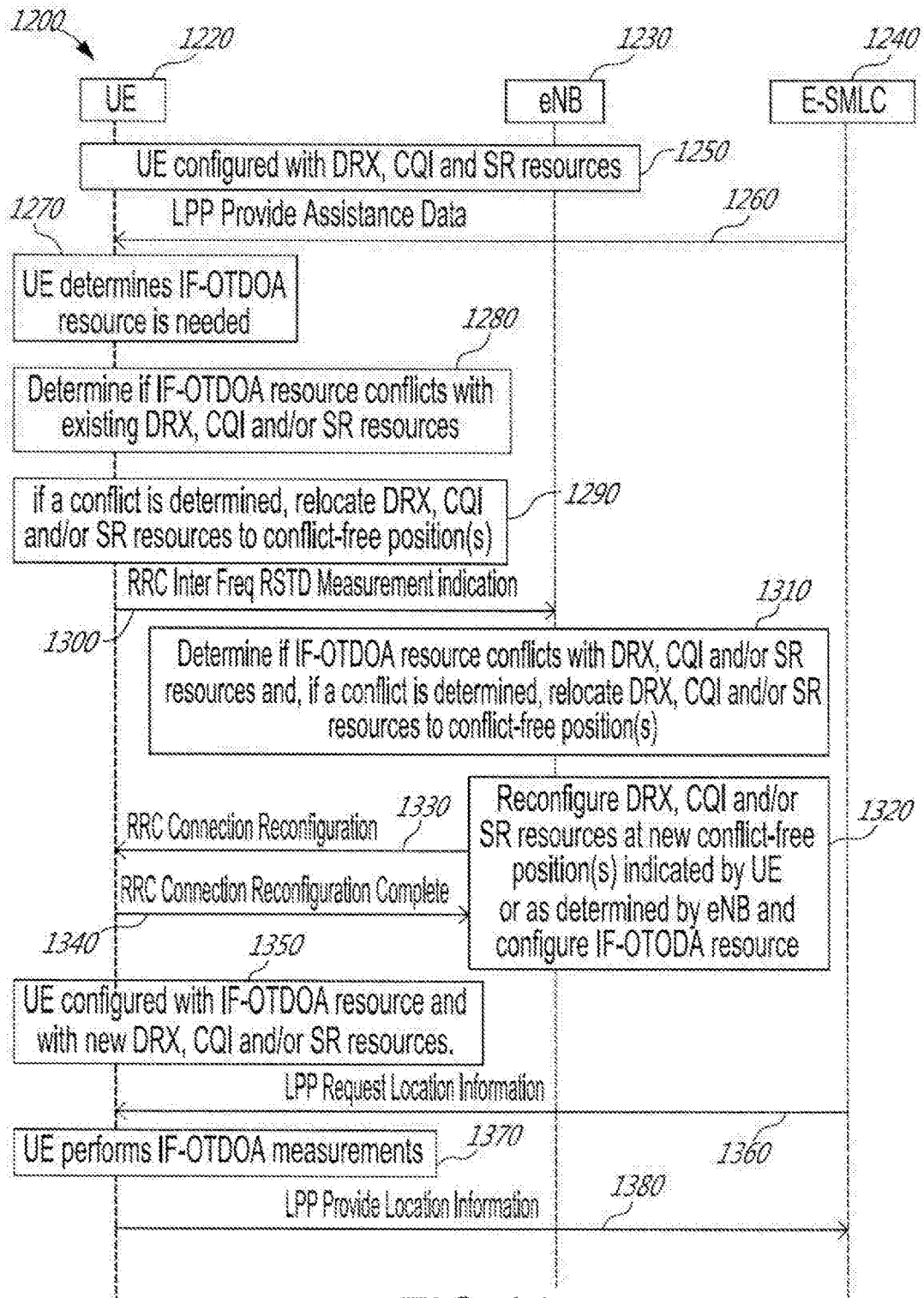
FIG. 11 is a signaling diagram of another method for reconfiguring DRX, CQI and SR resources as a result of a conflict with an IF-OTDOA resource in accordance with principles of the present disclosure.

FIG. 11 illustrates a variant of the IF-OTDOA example described above in relation to FIG. 9 where the UE (e.g. UE 1220) is configured to perform a conflict search to find conflict-free positions for resources conflicting with an IF-OTDOA resource. Similarly to the example of FIG. 9, the UE 1220 in this example is initially configured by an eNB 1230 with DRX, CQI and SR resources at step 1250 (e.g. while or shortly after the UE 1220 connects to the eNB 1230), either together as shown or in separate steps (not shown) with one or more configuration messages or some other message(s) to signal the appropriate resource parameters to the UE 1220 (e.g. offset, length and periodicity).

At step 1260, an E-SMLC server 1240 sends an LPP Provide Assistance Data message to the UE 1220 providing frequency and timing information necessary for the UE to perform inter-frequency measurements on neighbor cell reference signals (e.g. typically to determine UE positioning for emergency services). Based on the message received, the UE 1220 determines at step 1270 that an IF-OTDOA resource (e.g. a measurement gap) is needed to perform the desired measurements and identifies its specific parameters (e.g. a defined offset, length and/or periodicity). The UE 1220 then proceeds at step 1280 to determine whether the new IF-OTDOA resource conflicts with any of the existing DRX, CQI and/or SR resources using the conflict search described above in relation to FIG. 4.

If, at step 1290, a conflict exists, the UE 1220 finds a conflict-free position for the conflicting DRX, CQI and/or SR resources using the relocation process described above in relation to FIG. 5. If a conflict-free position is found, the UE 1220 at step 1300 sends a message to the eNB 1230 indicating a proposed reconfiguration of the conflicting DRX, CQI and/or SR resources. The example message shown at step 1300 is an existing RRC message (e.g an RRC InterFreqRSTDMeasurementIndication message) containing parameters for the reconfigured resource (e.g. a drxConfig parameter for DRX reconfiguration and/or a measGapConfig parameter for Mobility Gap reconfiguration) but the example is not limited as such and other new or existing messages (e.g. an RRC UpLink information Transfer message) could be used for that purpose. In the example shown, the RRC InterFreqRSTDMeasurementIndication message is also used by the UE 1220 to request the specific IF-OTDOA resource identified (e.g. with a defined offset, length and/or periodicity).

Once it receives a message from the UE 1220 indicating a proposed reconfiguration for the conflicting DRX, CQI and/or SR resource(s), the eNB 1230 can reconfigure the conflicting resources. In another embodiment, the eNB 1230 may optionally decide at step 1310 to run its own conflict search and relocation to resolve the conflict(s). In that scenario, if it finds a conflict, the eNB 1230 would relocate the conflicting resources to conflict-free position(s) which may or may not be the same as the conflict-free positions proposed by the UE 1220.

In either case, the eNB 1230 reconfigures the conflicting DRX, CQI and/or SR resource(s) at step 1320 at new conflict-free positions based on either the proposed reconfiguration received from the UE 1220 at step 1300 or based on its own determination. In one embodiment, the eNB 1230 reconfigures the conflicting resource(s) by sending an RRC ConnectionReconfiguration message (step 1330) to the UE 1220 with parameters for the reconfigured resource (e.g. a drxConfig parameter for DRX reconfiguration, a cqiReportConfig parameter for CQI reconfiguration and/or a schedulingRequestConfig parameter for SR reconfiguration). The same or a different RRC configuration message can be used to send the appropriate IF-OTODA parameters in an Information Element (e.g. measGapConfig) and configure the IF-OTDOA resource at the UE 1220. Once all of the resources have been (re)configured, the UE sends an RRC ConnectionReconfigurationComplete message to the eNB 1230 at step 1340 that acknowledges completion of the (re)configuration. With the reconfigured DRX, CQI and/or SR resources, the UE 1220 is configured at step 1350 to operate with DRX, CQI and/or SR resources that do not conflict with the new IF-OTDOA resource. Also, with the IF-OTDOA resource properly configured, the UE 1370 is able to respond to LPP Request Location Information messages received from the E-SMLC server 1240 at step 1360 by performing inter-frequency (e.g. OTDOA) measurements at step 1370 and sending the measurements to the E-SMLC server 1240 via an LPP Provide Location Information message at step 1380.

Similarly to the example of FIG. 9, the UE 1220 in this example is shown to be configured with the new IF-OTDOA resource at step 1320 after resolving conflicts between resources (steps 1280, 1290, 1300 and optionally 1310) but it is understood that the IF-OTODA resource may be configured before conflicts are resolved. Other permutations changing the order in which conflicts are resolved and resources are configured are also possible and within the scope of the present disclosure.

Another Conflict Management Example

Figure 12:
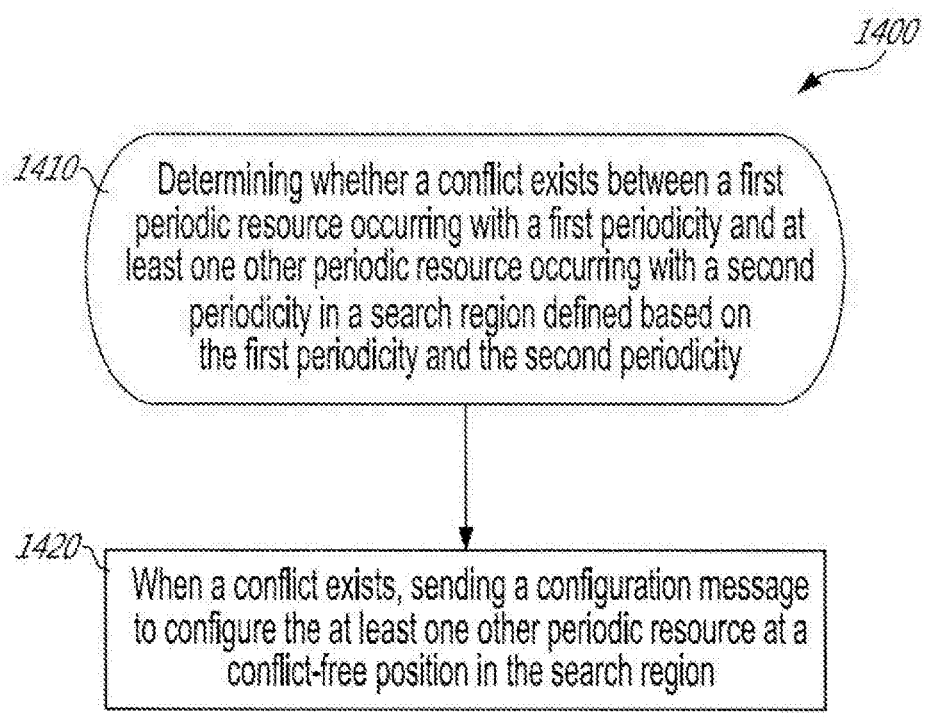
FIG. 12 is a flow chart of another example process for a node in a wireless communication network for configuring periodic resources in accordance with principles of the present disclosure.

FIG. 12 is another example flow chart of a process 1400 for a node (such as eNBs and UEs described above in relation to FIGS. 1-12) in a wireless communication network for configuring conflicting resources in accordance with principles of the present disclosure. The example process is described in reference to a base station node (e.g. an eNB) but it could equally be for other nodes in the network, including wireless devices (e.g. a UE) that may be configured to perform the functions described herein.

At step 1410, the node (e.g. a base station node or a wireless device node) proceeds to determine whether a conflict exists between a first periodic resource occurring with a first periodicity and at least one other periodic resource occurring with a second periodicity in a search region corresponding to a product of the first periodicity and the second periodicity. In one embodiment, the search region is equal to the product of the first periodicity and the second periodicity divided by a greatest common denominator of the first and second periodicity. In another embodiment, the at least one other periodic resource comprises a plurality K of secondary periodic resources, each occurring with a respective one of a plurality K of periodicities and the second periodicity corresponds to a largest periodicity of the plurality K of periodicities.

At step 1420, when a conflict has been determined, a configuration message is sent to configure the at least one other periodic resource at a conflict-free position in the search region. In one embodiment, the conflict-free position may, in one embodiment be in a relocation window of the search region corresponding to a period of the first periodicity. If the conflict determination is performed at a base station node, the configuration message is a reconfiguration message (e.g. an RRC Connection Reconfiguration message) sent from the node to the wireless device. In this case, the reconfiguration message is indicative of a reconfiguration for the at least one other resource. Alternatively, if the conflict determination is performed at a wireless device node, the configuration message is a reconfiguration message sent from the wireless device to a node which is indicative of a suggested reconfiguration for the at least one other periodic resource.

Other Node Examples

Figure 13:
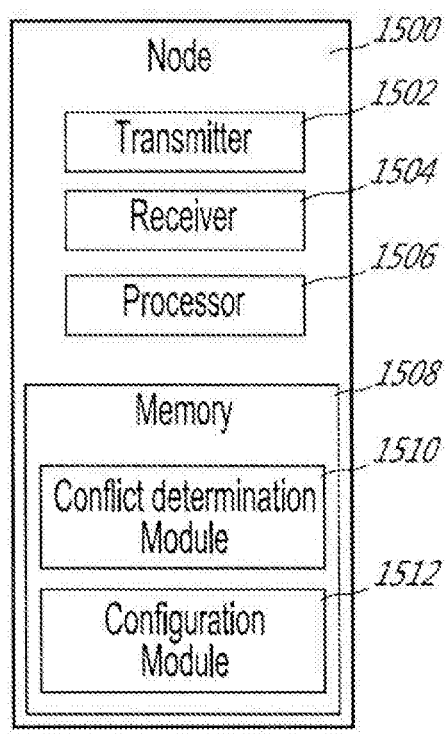
FIG. 13 is a block diagram of an exemplary embodiment of a node in a wireless communication network which is configured in accordance with principles of the present disclosure.
Figure 14:
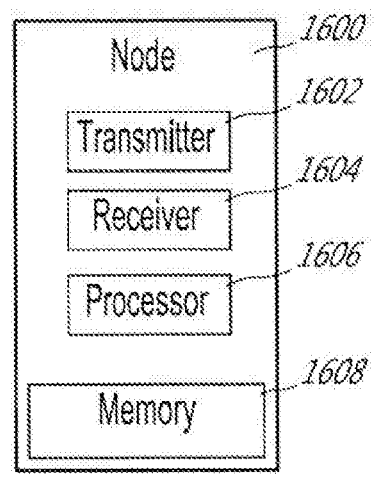
FIG. 14 is a block diagram of another exemplary embodiment of a node in a wireless communication network which is configured in accordance with principles of the present disclosure.

FIGS. 13, 14 are block diagrams of exemplary embodiments of a node 1500, 1600 (such as eNBs and UEs described above in relation to FIGS. 1-12)) configured to resolve conflicts between periodic resources in accordance with the principles of the present disclosure.

As illustrated in FIG. 13, node 1500 includes a transmitter 1502, a receiver 1504, one or more processor(s) 1506, memory 1508 which includes a conflict determination module 1510 and a configuration module 1512. In one embodiment, the transmitter 1502 and receiver 1504 may be replaced by a transceiver (not shown). The conflict determination module 1510 is configured to perform the conflict determination (or search) functionality described above which, as noted above includes determining or identifying conflicts between periodic resources for a UE. The configuration module is configured to perform the relocation and configuration functionality described above which, as noted above includes sending a configuration message for configuring a conflicting resource to a conflict-free position if a conflict exists with some other resource. The configuration module is also configured to relocate conflicting resources to conflict-free positions as described above. Depending on the type of node (e.g. either a base station node or a wireless device node), the configuration module may be configured differently to send a configuration message that, for example, indicates either an actual or a suggested reconfiguration for the conflicting resource. The configuration module 1512 is implemented at least partially in the memory 1508 in the form of software or (computer-implemented) instructions executed by the processor(s) 150 within the node 1500 or distributed across two or more nodes (e.g., the node 1500 and another node). In another example, the processor(s) 1506 includes one or more hardware components (e.g., Application Specific Integrated Circuits (ASICs)) that provide some or all of the conflict determination and configuration functionality described above. In another embodiment, the processor(s) 1506 includes one or more hardware components (e.g., Central Processing Units (CPUs)), and some or all of the conflict determination and configuration functionality described above is implemented in software stored in, e.g., the memory 1508 and executed by the processor 1506. In yet another embodiment, the processor(s) 1506 and memory 1608 form processing means (not shown) configured to perform the conflict determination and configuration functionality described above.

FIG. 14 shows a variant for the node example of FIG. 13 (denoted as node 1600) where circuitry containing (computer-implemented) instructions which when executed by the processor(s) 1606 cause the node to to perform some or all of the conflict determination (or search) and configuration functionality described above. In a variant, the circuitry includes a memory 1608 and one or more processor(s) 1606 which, similarly to node 1500 may be implemented in many different ways. In one example, the memory 1608 contains instructions which, when executed, cause the node 1600 to perform some or all of the conflict determination (or search) and configuration functionality described above. Other implementations are possible.

Other Contemplated Embodiments

The following is also noted in accordance with other contemplated embodiments:

According to a broad aspect of the disclosure, there is provided a method for a node in a communication network for configuring periodic radio resources for a wireless device in the communication network. The method includes determining whether a conflict exists between a first periodic resource occurring with a first periodicity and at least one other periodic resource occurring with a second periodicity, and when a conflict exists, sending a configuration message to configure the at least one other periodic resource at a conflict-free position.

In this aspect, in some embodiments, determining whether a conflict exists includes determining whether a conflict exists in a search region defined based on the first periodicity and the second periodicity. In some other embodiments, the search region is defined based on a product of the first periodicity and the second periodicity. In some other embodiments, the first periodic resource is one of a Multimedia Broadcast Multicast Server (MBMS) resource, an Observed Time Difference of Arrival (OTDOA) resource, an Automatic Neighbor Relations (ANR) resource, and a measurement gap resource. In some other embodiments, the at least one other periodic resource is at least one of a Discontinuous Reception (DRX) resource, a Channel Quality Indicator (CQI) resource, a Scheduling Request (SR) resource and a mobility gap resource.

In yet some other embodiments, the node is a base station node and the configuration message is a reconfiguration message indicative of a reconfiguration for the at least one other resource. Alternatively, the node is a wireless device node and the configuration message is a reconfiguration indication message indicative of a suggested reconfiguration for the at least one other periodic resource.

In yet some other embodiments, the at least one other periodic resource comprises a plurality K of secondary periodic resources, each occurring with a respective one of a plurality K of periodicities and wherein the second periodicity is a periodicity of one of the plurality K of secondary resources. In yet some other embodiments, the search region is equal to the product of the first periodicity and the second periodicity divided by a greatest common denominator of the first and second periodicity.

In yet some other embodiments, the configuration message is for configuring the at least one other periodic resource at a conflict-free position in a relocation window of the search region corresponding to a period of the first periodicity. In yet some other embodiments, determining whether a conflict exists includes determining that a conflict exists when an occurrence of the first periodic resource overlaps with an occurrence of the at least one other periodic resource in the search region. In yet some other embodiments, determining whether a conflict exists includes determining that no conflict exists when each occurrence of the first periodic resource in the search region does not overlap with any occurrence of the at least one other periodic resource in the search region. In yet some other embodiments, when a conflict exits with a secondary periodic resource, the method further includes moving the secondary periodic resource to a new position in the search region and when the new position does not overlap any other secondary periodic resource, sending the configuration message to configure the secondary periodic resource to the new position as the conflict-free position in the search region. In yet some other embodiments, when the new position overlaps with another secondary periodic resource, the method further includes moving the secondary periodic resource until the secondary periodic resource does not overlap with any other secondary periodic resource.

In yet some other embodiments, each of the first and the at least one other periodic resource is associated with a respective length, offset and periodicity. In yet some other embodiments, the at least one other periodic resource is a configured periodic resource and the configuration message is to re-configure the at least one other periodic resource to the conflict-free position in the search region.

In another broad aspect of the disclosure, there is provided a node for configuring periodic radio resources for a wireless device node, where the node contain instructions which, when executed, cause the node to determine whether a conflict exists between a first periodic resource occurring with a first periodicity and at least one other periodic resource occurring with a second periodicity, and when a conflict exists, send a configuration message to configure the at least one other periodic resource at a conflict-free position.

In some embodiments, the instructions further cause the node to determine whether a conflict exists in a search region defined based on the first periodicity and the second periodicity. In some other embodiments, the search region is defined based on a product of the first periodicity and the second periodicity. In some other embodiments, the circuitry includes a memory and one or more processors. In some other embodiments, the first periodic resource is one of an MBMS resource, an OTDOA resource, an ANR resource, and a measurement gap resource. In some other embodiments, the at least one other periodic resource is one of a DRX resource, a CQI resource, an SR resource and a mobility gap resource.

In yet some other embodiments, the node is a base station node and the configuration message is a reconfiguration message for the wireless device node, indicative of a reconfiguration for the at least one other resource. In yet some other embodiments, the node is a wireless device node and the configuration message is a reconfiguration indication message for a base station node, indicative of a suggested reconfiguration for the at least one other periodic resource.

In yet some other embodiments, the at least one other periodic resource comprises a plurality K of secondary periodic resources, each occurring with a respective one of a plurality K of periodicities and wherein the second periodicity is a periodicity of one of the plurality K of secondary resources. In yet some other embodiments, the search region is equal to the product of the first periodicity and the second periodicity divided by a greatest common denominator of the first and second periodicity.

In yet some other embodiments, the configuration message is to configure the at least one other periodic resource at a conflict-free position in a relocation window of the search region corresponding to a period of the first periodicity. In yet some other embodiments, the instructions further cause the node to determine that a conflict exists when an occurrence of the first periodic resource overlaps with an occurrence of the at least one other periodic resource in the search region.

In yet some other embodiments, the instructions further cause the node to determine that no conflict exists when each occurrence of the first periodic resource in the search region does not overlap with any occurrence of the at least one other periodic resource in the search region. In yet some other embodiments, when a conflict exits with a secondary periodic resource, the instructions further cause the node to move the secondary periodic resource to a new position in the search region, and when the new position does not overlap any other secondary periodic resource, send the configuration message to configure the secondary periodic resource to the new position as the conflict-free position in the search region.

In yet some other embodiments, when the new position overlaps with another secondary periodic resource, the instructions further cause the node to move the secondary periodic resource until the secondary periodic resource does not overlap with any other secondary periodic resource. In yet some other embodiments, each of the first and the at least one other periodic resource is associated with a respective length, offset and periodicity. In yet some other embodiments, the at least one other periodic resource is a configured periodic resource and wherein the configuration message is to re-configure the at least one other periodic resource to the conflict-free position in the search region.

In yet another broad aspect of the disclosure, there is provided a node for configuring periodic radio resources for a wireless device node, where the node includes a conflict determination module for determining whether a conflict exists between a first periodic resource occurring with a first periodicity and at least one other periodic resource occurring with a second periodicity. The node also includes a configuration module for sending a configuration message to configure the at least one other periodic resource at a conflict-free position when a conflict exists.

In some embodiments, conflict determination module is for determining whether a conflict exists in a search region defined based on the first periodicity and the second periodicity. In some other embodiments, the search region is defined based on a product of the first periodicity and the second periodicity. In some other embodiments, the first periodic resource is one of an MBMS resource, an OTDOA resource, an ANR resource, and a measurement gap resource. In some other embodiments, the at least one other periodic resource is one of a DRX resource, a CQI resource, an SR resource and a mobility gap resource.

In yet some other embodiments, the node is a base station node and the configuration message is a reconfiguration message for the wireless device node, indicative of a reconfiguration for the at least one other resource. In yet some other embodiments, the node is a wireless device node and the configuration message is a reconfiguration indication message for a base station node, indicative of a suggested reconfiguration for the at least one other periodic resource.

In yet some other embodiments, the at least one other periodic resource includes a plurality K of secondary periodic resources, each occurring with a respective one of a plurality K of periodicities and wherein the second periodicity is a periodicity of one of the plurality K of secondary resources. In yet some other embodiments, the search region is equal to the product of the first periodicity and the second periodicity divided by a greatest common denominator of the first and second periodicity.

In yet some other embodiments, the configuration message is to configure the at least one other periodic resource at a conflict-free position in a relocation window of the search region corresponding to a period of the first periodicity. In yet some other embodiments, the conflict determination module is for determining that a conflict exists when an occurrence of the first periodic resource overlaps with an occurrence of the at least one other periodic resource in the search region.

In yet some other embodiments, the conflict determination module is for determining that no conflict exists when each occurrence of the first periodic resource in the search region does not overlap with any occurrence of the at least one other periodic resource in the search region. In yet some other embodiments, when a conflict exits with a secondary periodic resource, the configuration module is for moving the secondary periodic resource to a new position in the search region, and when the new position does not overlap any other secondary periodic resource, send the configuration message to configure the secondary periodic resource to the new position as the conflict-free position in the search region.

In yet some other embodiments, when the new position overlaps with another secondary periodic resource, the configuration module is for moving the secondary periodic resource until the secondary periodic resource does not overlap with any other secondary periodic resource. In yet some other embodiments, each of the first and the at least one other periodic resource is associated with a respective length, offset and periodicity. In yet some other embodiments, the at least one other periodic resource is a configured periodic resource and wherein the configuration message is to re-configure the at least one other periodic resource to the conflict-free position in the search region.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method for a node in a communication network for configuring periodic radio resources for a wireless device in the communication network, the method comprising:
   determining whether a conflict exists between a first periodic resource occurring with a first periodicity and at least one other periodic resource occurring with a second periodicity in a search region defined based on the first periodicity and the second periodicity; and
   when a conflict exists, sending a configuration message to configure the at least one other periodic resource at a conflict-free position in the search region, the search region being defined based on the first periodicity, the second periodicity and a greatest common denominator of the first and second periodicity.

2. The method of claim 1, wherein the first periodic resource is one of a Multimedia Broadcast Multicast Server (MBMS) resource, and an Observed Time Difference of Arrival (OTDOA) resource, an Automatic Neighbor Relations (ANR) resource, and a measurement gap resource.

3. The method of claim 1, wherein the at least one other periodic resource is at least one of a Discontinuous Reception (DRX) resource, a Channel Quality Indicator (CQI) resource, a Scheduling Request (SR) resource and a mobility gap resource.

4. The method of claim 1, wherein the node is a base station node and the configuration message is a reconfiguration message indicative of a reconfiguration for the at least one other resource.

5. The method of claim 1, wherein the node is a wireless device node and the configuration message is a reconfiguration indication message indicative of a suggested reconfiguration for the at least one other periodic resource.

6. The method of claim 1, wherein the at least one other periodic resource comprises a plurality K of secondary periodic resources, each occurring with a respective one of a plurality K of periodicities and wherein the second periodicity is a periodicity of one of the plurality K of secondary resources.

7. The method of claim 1, wherein the search region is equal to a product of the first periodicity and the second periodicity divided by the greatest common denominator of the first and second periodicity.

8. The method of claim 1, wherein the configuration message is for configuring the at least one other periodic resource at a conflict-free position in a relocation window of the search region corresponding to a period of the first periodicity.

9. The method of claim 1, wherein determining whether a conflict exists comprises determining that a conflict exists when an occurrence of the first periodic resource overlaps with an occurrence of the at least one other periodic resource in the search region.

10. The method of claim 1, wherein determining whether a conflict exists comprises determining that no conflict exists when each occurrence of the first periodic resource in the search region does not overlap with any occurrence of the at least one other periodic resource in the search region.

11. The method of claim 6, wherein when a conflict exits with a secondary periodic resource, the method further comprising:
moving the secondary periodic resource to a new position in the search region; and
when the new position does not overlap any other secondary periodic resource, sending the configuration message to configure the secondary periodic resource to the new position as the conflict-free position in the search region.

12. The method of claim 11, wherein when the new position overlaps with another secondary periodic resource, the method further comprising moving the secondary periodic resource until the secondary periodic resource does not overlap with any other secondary periodic resource.

13. The method of claim 1, wherein each of the first and the at least one other periodic resource is associated with a respective length, offset and periodicity.

14. The method of claim 1, wherein the at least one other periodic resource is a configured periodic resource and wherein the configuration message is to re-configure the at least one other periodic resource to the conflict-free position in the search region.

15. A node for configuring periodic radio resources for a wireless device node, the node comprising circuitry containing instructions which, when executed, cause the node to:
determine whether a conflict exists between a first periodic resource occurring with a first periodicity and at least one other periodic resource occurring with a second periodicity in a search region defined based on the first periodicity and the second periodicity; and
when a conflict exists, send a configuration message to configure the at least one other periodic resource at a conflict-free position in the search region, the search region being defined based on the first periodicity, the second periodicity and a greatest common denominator of the first and second periodicity.

16. The node of claim 15, wherein the first periodic resource is one of a Multimedia Broadcast Multicast Server (MBMS) resource, and an Observed Time Difference of Arrival (OTDOA) resource, an Automatic Neighbor Relations (ANR) resource, and a measurement gap resource.

17. The node of claim 15, wherein the at least one other periodic resource is one of a Discontinuous Reception (DRX) resource, a Channel Quality Indicator (CQI) resource, a Scheduling Request (SR) resource and a mobility gap resource.

18. The node of claim 15, wherein the node is a base station node and the configuration message is a reconfiguration message for the wireless device node, indicative of a reconfiguration for the at least one other resource.

19. The node of claim 15, wherein the node is a wireless device node and the configuration message is a reconfiguration indication message for a base station node, indicative of a suggested reconfiguration for the at least one other periodic resource.

20. The node of claim 15, wherein the at least one other periodic resource comprises a plurality K of secondary periodic resources, each occurring with a respective one of a plurality K of periodicities and wherein the second periodicity is a periodicity of one of the plurality K of secondary resources.

21. The node of claim 15, wherein the search region is equal to a product of the first periodicity and the second periodicity divided by the greatest common denominator of the first and second periodicity.

22. The node of claim 15, wherein the configuration message is to configure the at least one other periodic resource at a conflict-free position in a relocation window of the search region corresponding to a period of the first periodicity.

23. The node of claim 15, wherein the instructions further cause the node to determine that a conflict exists when an occurrence of the first periodic resource overlaps with an occurrence of the at least one other periodic resource in the search region.

24. The node of claim 15, wherein the instructions further cause the node to determine that no conflict exists when each occurrence of the first periodic resource in the search region does not overlap with any occurrence of the at least one other periodic resource in the search region.

25. The node of claim 20, wherein when a conflict exits with a secondary periodic resource, the instructions further cause the node to:
move the secondary periodic resource to a new position in the search region; and
when the new position does not overlap any other secondary periodic resource, send the configuration message to configure the secondary periodic resource to the new position as the conflict-free position in the search region.

26. The node of claim 25, wherein when the new position overlaps with another secondary periodic resource, the instructions further cause the node to move the secondary periodic resource until the secondary periodic resource does not overlap with any other secondary periodic resource.

27. The node of claim 15, wherein each of the first and the at least one other periodic resource is associated with a respective length, offset and periodicity.

28. The node of claim 15, wherein the at least one other periodic resource is a configured periodic resource and wherein the configuration message is to re-configure the at least one other periodic resource to the conflict-free position in the search region.

* * * * *